(12) United States Patent
Sakamoto

(10) Patent No.: US 8,526,284 B2
(45) Date of Patent: Sep. 3, 2013

(54) MULTILAYER OPTICAL RECORDING MEDIUM WITH INTERFACIAL SURFACES

(75) Inventor: Tetsuhiro Sakamoto, Kanagawa (JP)

(73) Assignee: Sony Corportion, Tokyo (JP)

( * ) Notice: Subject to any disclaimer, the term of this patent is extended or adjusted under 35 U.S.C. 154(b) by 5 days.

(21) Appl. No.: 13/082,564

(22) Filed: Apr. 8, 2011

(65) Prior Publication Data

US 2011/0258653 A1    Oct. 20, 2011

(30) Foreign Application Priority Data

Apr. 15, 2010  (JP) ................................. 2010-094092

(51) Int. Cl.
*G11B 7/24* (2013.01)
(52) U.S. Cl.
USPC ......................... 369/94; 369/44.37; 369/47.45
(58) Field of Classification Search
USPC .......... 369/44.23, 44.26, 44.27, 44.32, 47.36, 369/47.38–47.4, 47.45, 47.55, 53.11–53.14, 369/53.2, 53.22, 53.23, 53.37, 94, 275.1–275.5, 369/280, 283, 286; 428/64.1–65.2; 720/718–724
See application file for complete search history.

(56) References Cited

U.S. PATENT DOCUMENTS

| | | |
|---|---|---|
| 2004/0139459 A1 | 7/2004 | Mishima et al. |
| 2006/0038875 A1 | 2/2006 | Ichimura |
| 2008/0170485 A1 | 7/2008 | Mishima |
| 2009/0303864 A1 | 12/2009 | Nagata |
| 2011/0206889 A1 * | 8/2011 | Mitsumori et al. .......... 428/64.4 |

FOREIGN PATENT DOCUMENTS

| | | | |
|---|---|---|---|
| JP | 08212551 A | * | 8/1996 |
| JP | 2004-213720 | | 7/2004 |
| JP | 2006-040456 | | 2/2006 |
| JP | 2006-059433 | | 3/2006 |
| JP | 2008-186588 | | 8/2008 |
| WO | WO 2010013321 A1 | * | 2/2010 |

OTHER PUBLICATIONS

English Translation of JP 08212551 A.*
European Search Report corresponding to European Serial No. 11002755.4 dated Jun. 20, 2011.

* cited by examiner

*Primary Examiner* — Nathan Danielsen
(74) *Attorney, Agent, or Firm* — Dentons US LLP

(57) ABSTRACT

A multilayer optical recording medium includes a plurality of interfacial surfaces that reflect an incident light beam, and neighboring ones of the interfacial surfaces has a spacer therebetween. When a light incident surface side is defined as an upper surface side, a different thickness layer unit including the spacers having different thicknesses arranged sequentially is disposed on the lowermost layer side, and the spacers each having a thickness different from the thickness of any one of the spacers arranged in the different thickness layer unit are sequentially arranged above the different thickness layer unit.

7 Claims, 17 Drawing Sheets

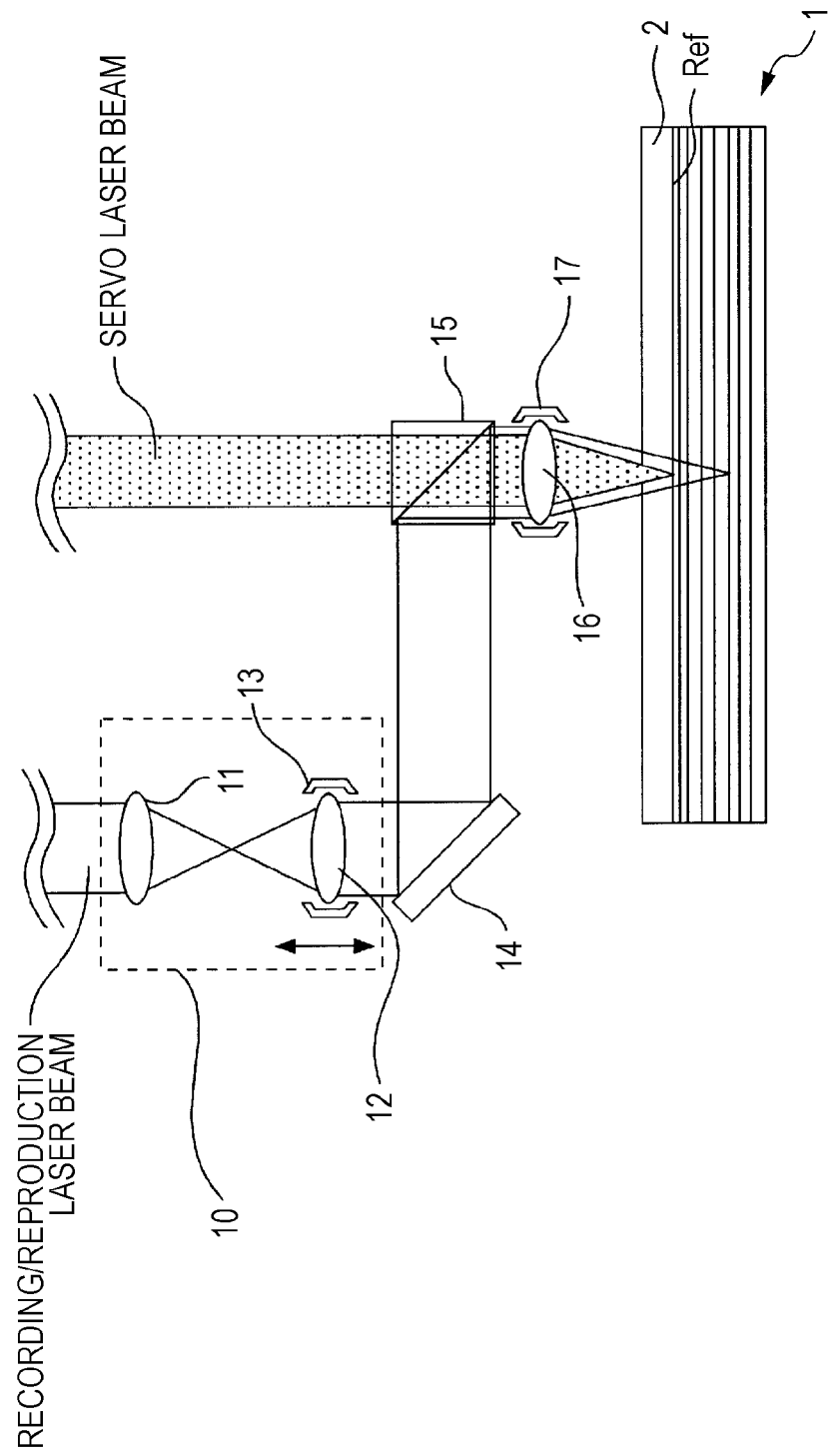

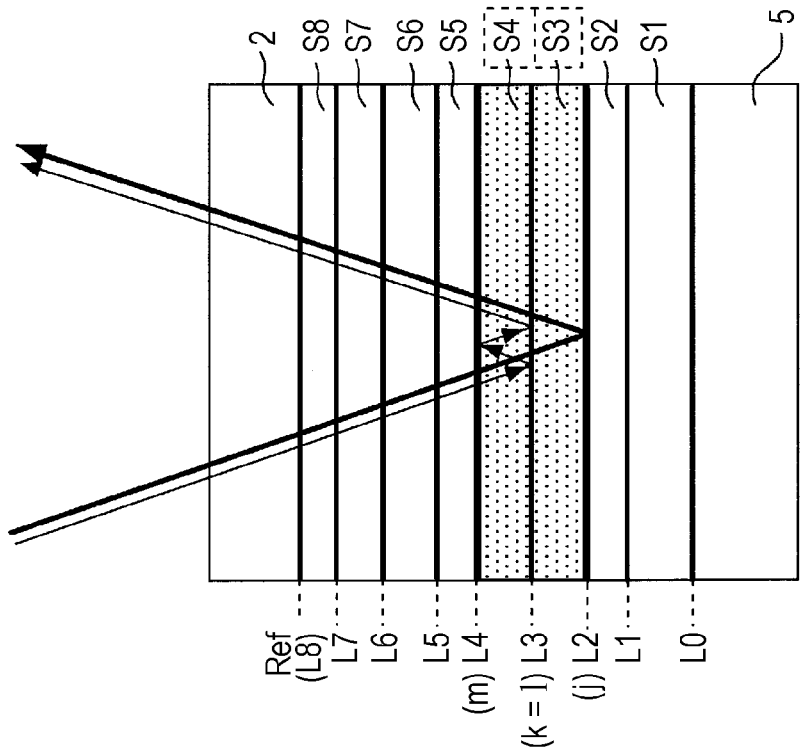
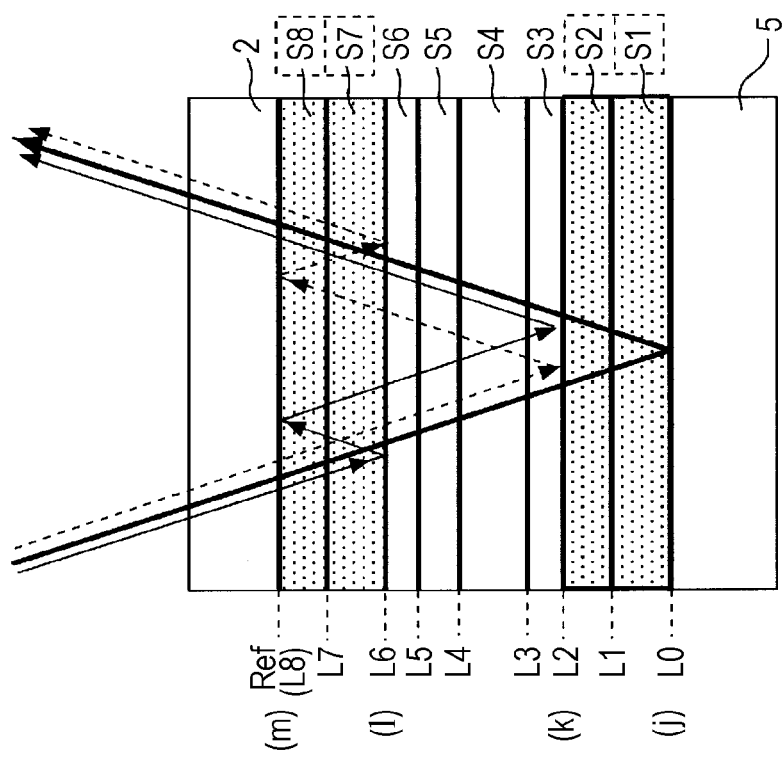

FIG. 12

| RECORDING LAYER | L0 | L1 | L2 | L3 | L4 | L5 | L6 | L7 | L8 | L9 | L10 | L11 |
|---|---|---|---|---|---|---|---|---|---|---|---|---|
| REFLECTANCE | 0.18 | 0.09 | 0.05 | 0.035 | 0.028 | 0.025 | 0.022 | 0.02 | 0.018 | 0.018 | 0.016 | 0.016 |
| TRANSMITTANCE | 1 | 0.68 | 0.768 | 0.815 | 0.93 | 0.934 | 0.938 | 0.938 | 0.96 | 0.96 | 0.96 | 0.96 |

| RECORDING LAYER | L12 | L13 | L14 | L15 | L16 | L17 | L18 | L19 | L20 | L21 | L22 | L23 |
|---|---|---|---|---|---|---|---|---|---|---|---|---|
| REFLECTANCE | 0.014 | 0.014 | 0.012 | 0.012 | 0.01 | 0.01 | 0.009 | 0.009 | 0.008 | 0.008 | 0.007 | 0.007 |
| TRANSMITTANCE | 0.96 | 0.96 | 0.96 | 0.96 | 0.96 | 0.96 | 0.96 | 0.96 | 0.96 | 0.96 | 0.96 | 0.96 |

MULTILAYER OPTICAL RECORDING MEDIUM WITH INTERFACIAL SURFACES

BACKGROUND OF THE INVENTION

1. Field of the Invention

The present invention relates to a multilayer optical recording medium having a plurality of interfacial surfaces that reflect an incident light beam.

2. Description of the Related Art

Recently, optical recording media, such as CDs (compact discs), DVDs (digital versatile discs), and BDs (Blu-ray discs (trade name)), have been in widespread use.

Among such recording media, recordable optical recording media having a recording film (a recording layer) have a plurality of recording layers in order to increase the recording capacity. In particular, in recent years, multilayer optical recording media having three or more recording films have been developed (refer to, for example, Japanese Unexamined Patent Application Publication No. 2004-213720).

However, in multilayer optical recording media, so-called interlayer stray light is generated. Thus, a problem of multiple interference arises. As used herein, the term "multiple interference" refers to a phenomenon in which a reflected light beam from a recording film from which information is to be reproduced is interfered with light beams reflected from three or more interfacial surfaces (light reflective interfacial surfaces) other than the recording film for reproduction and, thus, a variation in light intensity occurs on a detector.

Naturally, it is desirable to prevent the occurrence of multiple interference in order to prevent a decrease in the reproduction performance.

For triple-layer optical recording media having three recording films, the occurrence of multiple interference can be prevented by making the thicknesses of spacers formed between the recording films different from one another.

This can be understood by looking at the case in which a triple-layer optical recording medium has a spacer between recording films $Lrc0$ and $Lrc1$ ($Lrc0$ indicates the lowermost recording film) with a thickness that is the same as the thickness of a spacer between the recording film $Lrc1$ and a recording film $Lrc2$, and information in the recording film $Lrc0$ is reproduced. That is, in this case, the optical path length of a light beam focused onto the recording film $Lrc0$ and reflected by the recording film $Lrc0$ (a reproduction light beam—an interfered light beam) is the same as the optical path length of a light beam sequentially reflected by the recording film $Lrc1$, the recording film $Lrc2$ (the lower surface), and the recording film $Lrc1$ (i.e., a stray light beam). Thus, these light beams are interfered with one another and, therefore, multiple interference occurs.

Accordingly, for a triple-layer optical recording medium, by employing different thicknesses for the spacers formed between the recording films, the optical path length of the interfered light beam can be made different from the optical path length of the stray light beam. In this way, the occurrence of the multiple interference can be prevented.

However, for a multilayer optical recording medium having four or more layers, it is difficult to prevent the occurrence of multiple interference only by employing different thicknesses for the spacers.

For example, as shown in FIG. 17, a multilayer optical recording medium having five recording films Lrc (i.e., recording films $Lrc0$ to $Lrc4$) is discussed. A spacer $S1$ having a thickness of 4 is formed between the recording films $Lrc0$ and $Lrc1$. A spacer $S2$ having a thickness of 2 is formed between the recording films $Lrc1$ and $Lrc2$. A spacer $S3$ having a thickness of 3 is formed between the recording films $Lrc2$ and $Lrc3$. A spacer $S4$ having a thickness of 1 is formed between the recording films $Lrc3$ and $Lrc4$. In this way, the thicknesses of the spacers are set to different values.

In such a case, when information recorded in the lowermost recording film $Lrc0$ is reproduced, the optical path length of a stray light beam reflected by the recording films $Lrc2$, $Lrc4$, and $Lrc1$ in this order (indicated as a thin solid arrow in FIG. 17) is the same as the optical path length of a stray light beam reflected by the recording films $Lrc1$, $Lrc4$, and $Lrc2$ in this order (indicated as a thin dotted arrow in FIG. 17) for a reproduction light beam (indicated as a thick solid arrow in FIG. 17). Thus, the two stray light beams interfere with the reproduction light beam. This is because the thickness of the spacer $S1$ is the same as the sum of thicknesses of the spacers $S3$ and $S4$.

As described above, in a multilayer optical recording medium having four or more recording films, it is difficult to prevent the occurrence of the multiple interference only by employing different thicknesses for the spacers.

SUMMARY OF THE INVENTION

Note that in order to increase the number of the layers of an optical recording medium, the efficiency of manufacturing the recording medium is important. As can be seen from the above description, it is necessary to employ different thicknesses for all the spacers in order to prevent the occurrence of multiple interference. This results in the necessity of using different layering processes for the spacers. Accordingly, the efficiency of manufacturing the recording medium is decreased.

In addition, if the number of layers is further increased in order to produce a multilayer optical recording medium having, for example, several tens of layers, it is significantly difficult to completely prevent the occurrence of multiple interference. That is, in order to completely prevent the occurrence of multiple interference, as illustrated in FIG. 17, it is necessary to set not only the thicknesses of individual spacers but also the sums of pluralities of the thicknesses so that these thicknesses are not the same. However, in order to realize such thicknesses, the entire thickness of the optical recording medium significantly increases. As a result, it is significantly difficult to correct spherical aberration occurring in each of the layers.

It should be noted that it is not necessary to completely prevent the occurrence of multiple interference, but the multiple interference can be reduced to a certain level so that a certain reproduction performance is maintained.

Accordingly, the present invention provides a producible multilayer optical recording medium capable of reducing multiple interference while maintaining excellent manufacturing efficiency.

Accordingly, a multilayer optical recording medium of the present invention employs the following structure.

That is, according to an embodiment of the present invention, a multilayer optical recording medium includes a plurality of interfacial surfaces that reflect an incident light beam, where neighboring ones of the interfacial surfaces has a spacer therebetween. When a light incident surface side is defined as an upper surface side, a different thickness layer unit including the spacers having different thicknesses arranged sequentially is disposed on the lowermost layer side, and the spacers each having a thickness different from the thickness of any one of the spacers arranged in the different thickness layer unit are sequentially arranged above the different thickness layer unit.

In this way, according to the embodiment, the different thickness layer unit including spacers having different thicknesses is formed on the lowermost layer side, and an equal-thickness layer unit including spacers each having the same thickness sequentially arranged is formed above the different thickness layer unit.

By disposing the different thickness layer unit on the lowermost layer side, the occurrence of serious multiple interference can be effectively reduced. That is, since, as described below, the level of the multiple interference increases the further the interfacial surface through which the interfering light beam travels is located toward the lower layer side, the different thickness layer unit is disposed on the lowermost layer side, as described above. That is, by avoiding the presence of the spacers having the same thickness on the lowermost layer side, the occurrence of serious multiple interference can be effectively prevented.

In addition, by disposing an equal-thickness layer unit including spacers each having the same thickness sequentially arranged above the different thickness layer unit, the occurrence of multiple interference can be effectively reduced, as described below.

In this way, according to the embodiment of the present invention, the occurrence of multiple interference in a multilayer optical recording medium can be effectively reduced.

In addition, since the structure includes spacers each having the same thickness and sequentially arranged, that portion can be manufactured using the same layering process. Thus, the manufacturing efficiency can be improved, as compared with, for example, a structure in which all of the spacers have different thicknesses. Furthermore, since use of the arrangement in which spacers each having the same thickness is allowed, the entire thickness of the recording medium can be advantageously reduced, as compared with a structure in which the thicknesses of the spacers are determined so that the occurrence of multiple interference is completely prevented.

Thus, according to the embodiment of the present invention, the occurrence of multiple interference can be reduced while maintaining the excellent manufacturing efficiency of a multilayer optical recording medium.

BRIEF DESCRIPTION OF THE DRAWINGS

FIG. 3 is a schematic illustration of an optical system that performs recording and reproduction operations on the multilayer optical recording medium according to the embodiment;

FIGS. 4A and 4B are diagrams used for discussing interfering light that causes a practical problem;

FIG. 12 illustrates an example of setting the energy reflectance and the energy transmittance of each interfacial surface;

DESCRIPTION OF THE PREFERRED EMBODIMENTS

Exemplary embodiments of the present invention are described below. The descriptions are made in the following order:

1. Cross-Section Structure of Multilayer Optical Recording Medium and Recording/reproduction
2. Setting of Thickness of Spacer to Prevent Multiple Interference
2-1 Discussion on Multiple Interference
2-2 Design Guide for Effectively Reducing Multiple Interference
2-3 Technique for Setting Thickness of Spacer according to Embodiment
2-4 Examples of Setting of Thickness of Spacer
3. Modifications 1. Cross-Section Structure of Multilayer Optical Recording Medium and Recording/Reproduction FIG. 1 illustrates an exemplary cross-section structure of a multilayer optical recording medium (a multilayer optical recording medium 1) according to an embodiment of the present invention.

The multilayer optical recording medium 1 has a disc shape. Marks are recorded (information is recorded) on the multilayer optical recording medium 1 by emitting a laser beam onto the multilayer optical recording medium 1 that is rotatingly driven. In addition, in order to reproduce information recorded on the multilayer optical recording medium 1, a laser beam is emitted onto the multilayer optical recording medium 1 that is rotatingly driven.

As used herein, the term "optical recording medium" generally refers to a recording medium on which information is recorded and from which information is reproduced by emitting a light beam thereto.

Figure 1:
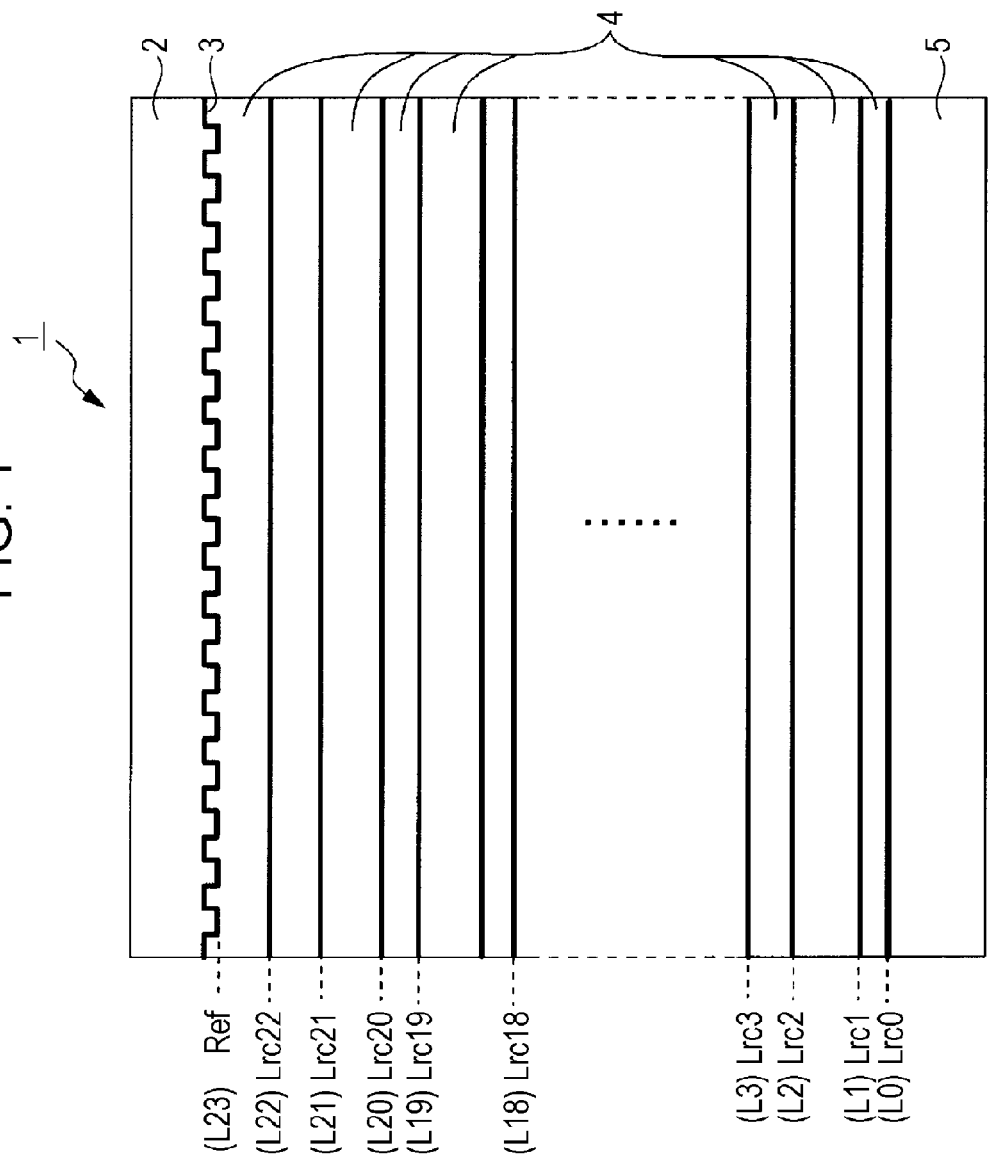
FIG. 1 illustrates an exemplary cross-section structure of a multilayer optical recording medium according to an embodiment of the present invention.

As shown in FIG. 1, the multilayer optical recording medium 1 is of a bulk type. The multilayer optical recording medium 1 includes a cover layer 2 and a selective reflecting film 3 from the top. As an underlayer of the selective reflecting film 3, a recording layer having a structure in which a spacer 4 and a recording film Lrc are alternately stacked (a recordable region including a plurality of the recording films Lrc) is formed. As an underlayer of the recording layer, a substrate 5 is formed.

As used herein, the term "upper layer side" refers to an upper layer side when a light beam used for recording and reproducing information is emitted through the top surface.

The cover layer 2 of the multilayer optical recording medium 1 is formed of a resin, such as polycarbonate or acrylic. As shown in FIG. 1, a guide groove is formed on the lower surface of the cover layer 2. The guide groove is in the form of a groove or a pit string. The guide groove serves as a position indicator for indicating the recording/reproduction position. Thus, a cross section having irregularity is provided. The guide groove has a spiral shape or a concentric shape.

For example, when the guide groove is formed from a pit string, the position information (the absolute position information, that is, rotation angle information indicating the rotation angle position on the disc and radius position information) is recorded using a combination of the lengths of a pit and a land. In contrast, when the guide groove is formed from a groove itself, the groove is formed so as to periodically snake (wobble). Thus, the position information is recorded in the form of the periodic information in a snaking path.

The cover layer 2 can be formed through injection molding using a stamper having such a groove (irregularity) thereon or through thermal transfer of the shape of such stamper to a film.

In addition, the selective reflecting film 3 is coated on the lower surface of the cover layer 2 having the above-described pit string formed thereon. The selective reflecting film 3 is described in more detail below.

In this way, the recording layer is formed on the lower surface of the selective reflecting film 3.

In the recording layer, the spacer 4 is formed of an adhesive material, such as an ultraviolet-curable resin.

The recording film Lrc serves as a film having marks formed when a laser beam is focused thereon and capable of reflecting an incident light beam. For example, in such a case, the recording film Lrc is formed by stacking a recording material, such as a rewritable recording film (e.g., a phase-change film) or a recordable inorganic film or a variety of recordable organic dye films exhibiting an irreversible reaction to application of heat, on the reflecting film.

Note that when recording is performed using a mark portion formed as a low-reflectance portion by, for example, burning out the reflecting film, the recording film Lrc can be formed using only a reflecting material. Even in such a case, the recording film Lrc similarly reflects the incident light beam.

According to the present embodiment, for example, twenty-three recording films Lrc (i.e., Lrc0 to Lrc22) are formed in the recording layer. At that time, the recording film Lrc0 (the lowermost layer) is formed from a total reflection recording film that totally reflects the incident light beam, and each of the recording films Lrc1 to Lrc22 is formed from a translucent recording film that transmits part of the incident light beam.

The substrate 5 is formed from a resin, such as polycarbonate or acrylic.

For example, the multilayer optical recording medium 1 having the structure shown in FIG. 1 can be produced through the following processes.

First, a total reflection recording film serving as the recording film Lrc0 is formed on the substrate 5. Thereafter, the spacer 4 and a translucent recording film are alternately and repeatedly stacked on the recording film Lrc0. Thus, the recording films up to the recording film Lrc22 are formed.

Simultaneously, the cover layer 2 is formed so as to have an irregular cross section due to formation of position indicators through injection molding using the above-described stamper. Thereafter, the selective reflecting film 3 is coated on the surface of the cover layer 2 having the formed irregularities.

Subsequently, the cover layer 2 having the selective reflecting film 3 formed thereon is bonded to the upper surface of the recording film Lrc22 using an ultraviolet-curable resin serving as the spacer 4 so that the surface of the cover layer 2 having the selective reflecting film 3 formed thereon faces the upper surface of the recording film Lrc22. More specifically, for example, the ultraviolet-curable resin is applied onto the recording film Lrc22 using a spin coating technique. Thereafter, ultraviolet light is emitted to the ultraviolet-curable resin with the surface of the cover layer 2 having the selective reflecting film 3 formed thereon urged against the ultraviolet-curable resin. Thus, the ultraviolet-curable resin is cured and, therefore, the selective reflecting film 3 and the recording film Lrc22 are formed with the spacer 4 therebetween, as shown in FIG. 1.

Note that at that time, in the above-described multilayer optical recording medium 1, none of the recording films Lrc has a position indicator.

That is, while a dual-layer disc widely used currently has a position indicator for each of the recording films, the multilayer optical recording medium 1 according to the present embodiment has only one position indicator in a layer other than a recording layer.

Unlike the structure in which a position indicator is formed for each of the recording films Lrc, such a structure does not increase the number of processes for forming position indicators with an increase in the number of the recording films Lrc. Accordingly, the manufacturing process can be advantageously simplified, and the manufacturing cost can be more reduced as the number of layers is increased.

However, when the structure including only one layer having a position indicator is employed and if a laser beam for recording and reproduction (hereinafter referred to as a "recording/reproduction laser beam") is simply emitted through an objective lens, it is difficult to record a mark at a desired position when information is recorded on each of the recording films Lrc.

Figure 2:
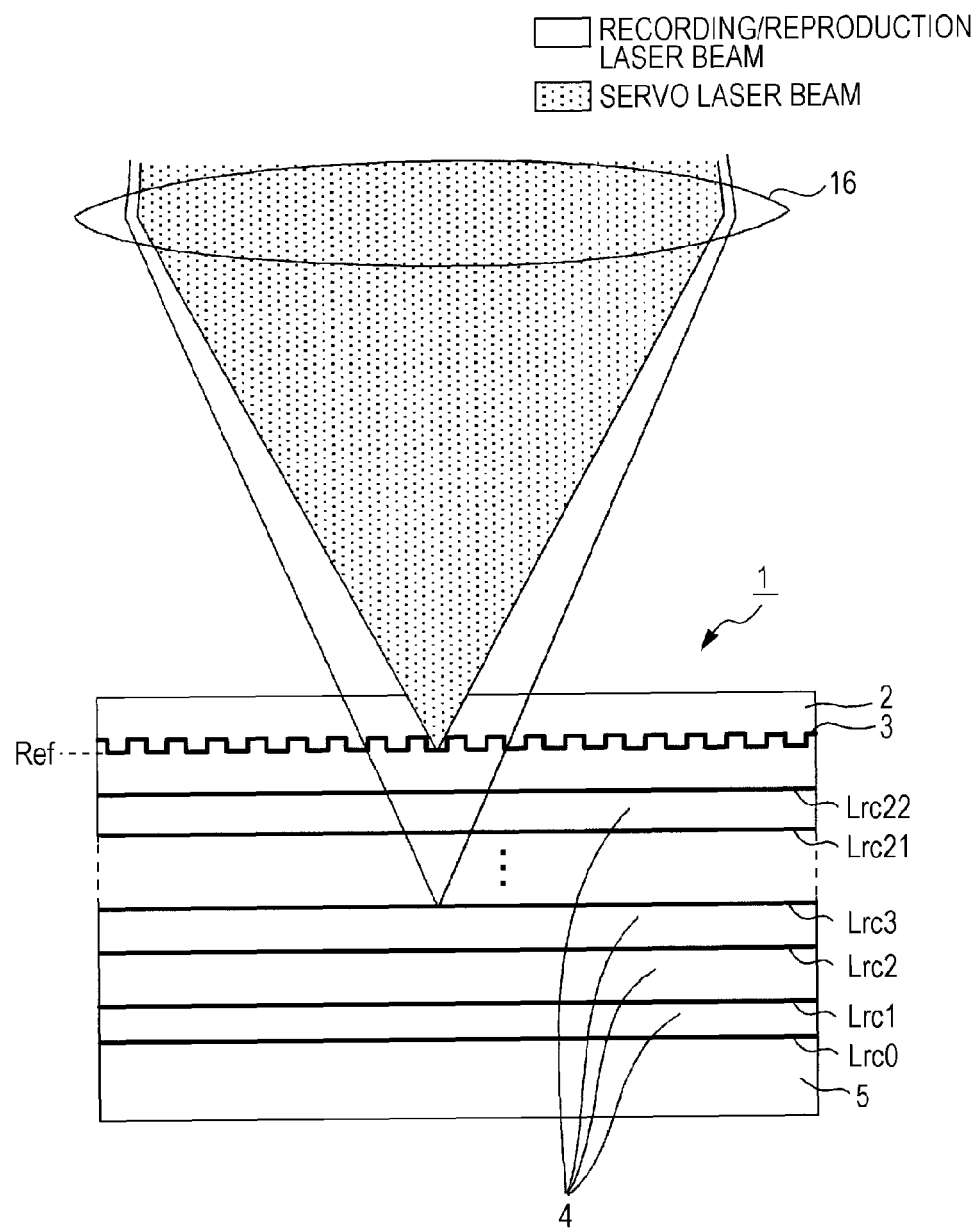
FIG. 2 illustrates an example of servo control performed on the multilayer optical recording medium according to the embodiment.

Accordingly, a servo laser beam for position control is separately emitted to the multilayer optical recording medium 1 having the structure shown in FIG. 1 through a shared objective lens 16 in addition to the recording/reproduction laser beam, as shown in FIG. 2.

Note that according to the present embodiment, the effective numerical aperture of the objective lens 16 is about 0.85 for the recording/reproduction laser beam and about 0.6 for the servo laser beam.

At that time, if the servo laser beam reaches the recording film Lrc, a process of recording a mark may be affected. Therefore, the servo laser beam has a wavelength range different from that of the recording/reproduction laser beam. In addition, the selective reflecting film 3 having a position indicator formed thereon has wavelength selectivity so as to reflect the servo laser beam (a beam having a wavelength within a predetermined range) and allow the recording/reproduction laser beam (a beam other than the beam having a wavelength within the predetermined range) to pass therethrough.

According to the present embodiment, the wavelength of the recording/reproduction laser beam is set to about 405 nm, and the wavelength of the servo laser beam is set to about 650 nm.

Under the above-described conditions, an example of servo control performed on the multilayer optical recording medium 1 is described next.

First, tracking servo control is differently performed for recording and reproduction.

More specifically, during a recording operation in which a mark has not yet been formed, it is difficult to use a tracking servo in accordance with the recording/reproduction laser beam reflected by the recording film Lrc. Thus, during the recording operation, tracking servo control of the objective lens 16 is performed in accordance with the servo laser beam reflected by the selective reflecting film 3 so that the spot position of the servo laser beam follows the position indicator.

In this way, even when the position indicator is not formed on each of the recording films Lrc, a mark can be recorded on the recording films Lrc at a predetermined position (a position immediately beneath the track serving as a position indicator).

In contrast, during a reproduction operation in which a mark string has already been formed on the recording films Lrc, tracking servo control can be performed using the recorded mark string. Accordingly, during a reproduction operation, tracking servo control for the objective lens 16 can be performed in accordance with the recording/reproduction laser beam reflected by the recording film Lrc so that the spot position of the recording/reproduction laser beam follows the recorded mark string.

As can be seen from the above description, the surface of the selective reflecting film 3 having the position indicator formed thereon serves as a reflecting surface used as a reference for controlling the position of the recording/reproduction laser beam using the servo laser beam. For this reason, hereinafter, the surface of the selective reflecting film 3 having the position indicator formed thereon is referred to as a "reference surface Ref".

The following points should be noted for focus servo control.

That is, during a recording operation, in order to perform tracking servo control of the objective lens 16 on the basis of the position indicator formed on the above-described reference surface Ref, it is necessary for the servo laser beam to be focused on the reference surface Ref. In addition, naturally, it is necessary for the recording/reproduction laser beam to be focused on the recording film Lrc on which information is to be recorded.

In this way, during a recording operation, it is necessary that different servo control operations be performed for different layer positions. For this reason, an apparatus that records and reproduces information onto and from the multilayer optical recording medium 1 includes a recording and reproduction focusing mechanism that independently controls a focus position of the recording/reproduction laser beam and that is provided separately from a biaxial actuator that controls the position of the objective lens 16.

FIG. 3 is a schematic illustration of an optical system that performs recording and reproduction operations on the multilayer optical recording medium 1 and that includes the above-described mechanism for independently controlling the focus position of the recording/reproduction laser beam.

As shown in FIG. 3, the objective lens 16 also shown in FIG. 2 is supported by a biaxial actuator 17 in a movable manner in a radial direction of the multilayer optical recording medium 1 (i.e., a tracking direction) and in a direction in which the objective lens 16 moves closer to or away from the multilayer optical recording medium 1 (i.e., a focusing direction).

In FIG. 3, a recording/reproduction beam focusing mechanism 10 independently controls the focus position of the recording/reproduction laser beam. As shown in FIG. 3, the recording/reproduction beam focusing mechanism 10 includes a stationary lens 11, a movable lens 12, and a lens drive unit 13. The lens drive unit 13 moves the movable lens 12 in a direction parallel to the optical axis of the recording/reproduction laser beam on the basis of a drive signal output from a control unit (not shown). In this way, when the movable lens 12 is moved in a direction parallel to the optical axis of the recording/reproduction laser beam, the collimation of the recording/reproduction laser beam made incident on the objective lens 16 varies. Accordingly, the focus position of the recording/reproduction laser beam can be changed independently from the servo laser beam.

In addition, as described above, the wavelength range of the recording/reproduction laser beam differs from that of the servo laser beam. Accordingly, the optical unit is designed so that the recording/reproduction laser beam and the servo laser beam reflected by the multilayer optical recording medium 1 are separated by a dichroic prism 15 (refer to FIG. 3) and input to different systems (i.e., the two reflection light beam are independently detected).

Furthermore, for an incident light beam, the dichroic prism 15 can combine the recording/reproduction laser beam and the servo laser beam along the same axis and makes the combined beam incident on the objective lens 16. More specifically, in such a case, as shown in FIG. 3, the recording/reproduction laser beam travels via the recording/reproduction beam focusing mechanism 10 (the stationary lens 11 and, thereafter, the movable lens 12) and reflected by a mirror 14. Subsequently, the recording/reproduction laser beam is reflected by a selective reflecting surface of the dichroic prism 15 and is made incident on the objective lens 16. In contrast, the servo laser beam passes through the selective reflecting surface of the dichroic prism 15 and is made incident on the objective lens 16.

In such a configuration of the optical system, focus servo control is performed as follows.

That is, through focus servo control of the objective lens 16 based on the reflected servo laser beam, the focus position of the servo laser beam tracks the reference surface Ref. In addition, through focus servo control of the recording/reproduction beam focusing mechanism 10 (the lens drive unit 13) based on the reflected recording/reproduction laser beam, the focus position of the recording/reproduction laser beam tracks the recording film Lrc on which information is to be recorded.

Note that, as noted above, tracking servo control during a reproduction operation is performed by driving the objective lens 16 in accordance with a reflected recording/reproduction laser beam for the recorded mark string. Accordingly, during a reproduction operation, it is not necessary for the servo laser beam to be focused on the reference surface Ref. For this reason, during a reproduction operation, focus servo control of the objective lens 16 may be performed on the basis of the reflected recording/reproduction laser beam. In such a case, the recording/reproduction beam focusing mechanism 10 can be used for coarsely selecting the recording films Lrc, that is, coarsely moving the focus position of the recording/reproduction laser beam.

Referring back to FIG. 1, the description continues.

The multilayer optical recording medium 1 shown in FIG. 1 includes 24 interfacial surfaces $L_i$ (L0 to L23) that reflect an incident light beam, as shown in parentheses in FIG. 1.

According to the above description, the selective reflecting film 3 has selectivity as to whether it allows the recording/reproduction laser beam to pass therethrough in accordance with the wavelength of the recording/reproduction laser beam. Accordingly, the reference surface Ref can be excluded from the interfacial surfaces that reflect an incident recording/ reproduction laser beam, which may be an interfered light beam of multiple interference.

However, in reality, it is difficult to obtain wavelength selectivity of 100% for the selective reflecting film 3. Thus, it is very difficult to make reflection of the recording/reproduction laser beam from the reference surface Ref zero. Thus, the reference surface Ref is included in the "interfacial surfaces".

In contrast, literally, the "interfacial surfaces" include an interfacial surface between two media having different indices of reflection in addition to a surface having a reflecting thin film formed thereon. Accordingly, the surface of the multilayer optical recording medium 1 (the surface of the cover layer 2) is included in the interfacial surfaces $L_i$.

However, according to the present embodiment, the surface of the cover layer 2 is covered with a nonreflective coating, such as antireflection (AR) coating. Thus, the surface of the cover layer 2 is excluded from the interfacial surfaces $L_i$.

As described above, according to the present embodiment, the multilayer optical recording medium 1 has 24 "interfacial surfaces that reflect an incident light beam" (L0 to L23 for the recording films Lrc0 to Lrc22 and the reference surface Ref).

2. Setting of Thickness of Spacer to Prevent Multiple Interference 2-1 Discussion on Multiple Interference Interfering light of the multiple interference is discussed first with reference to FIGS. 4A and 4B. In the following discussion, definitions are made as follows.

Let $L_i$ (i=0, 1, ..., N) denote the individual interfacial surfaces that reflect an incident light beam. At that time, an interfacial surface having a smaller value is disposed on the lower layer side.

In addition, let $S_i$ (i=0, 1, ..., N) denote the thickness of a layer formed between the interfacial surfaces $L_{i-1}$ and $L_i$.

Under such definitions, description is made with reference to FIGS. 4A and 4B.

In FIGS. 4A and 4B, for simplicity, a multilayer optical recording medium having 9 interfacial surfaces $L_i$ (i=0 to 8) (including the reference surface Ref) is shown.

FIG. 4A illustrates stray light beams (interfering light beams) that cause, during a reproduction operation, multiple interference on the interfacial surface L0 (the recording film Lrc0) when the sum of a spacer thickness S7 between the interfacial surface L6 (the recording film Lrc6) and the interfacial surface L7 (the recording films Lrc7) and a spacer thickness S8 between the interfacial surface L7 and the interfacial surface L8 (the reference surface Ref) of the multilayer optical recording medium (S7+S8) is equal to the sum of a spacer thickness S1 between the interfacial surface L0 (the recording films Lrc0) and the interfacial surface L1 (the recording film Lrc1) and a spacer thickness S2 between the interfacial surface L1 and the interfacial surface L2 (the recording film Lrc2) (S1+S2).

FIG. 4B illustrates an interfering light beam that is generated on the interfacial surface L2 during a reproduction operation when a spacer thickness S3 between the interfacial surface L2 (the recording film Lrc2) and the interfacial surface L3 (the recording films Lrc3) is equal to a spacer thickness S4 between the interfacial surface L3 and the interfacial surface L4 (the recording film Lrc4).

Note that, in FIGS. 4A and 4B, a thick solid arrow represents a light beam focused onto the interfacial surface $L_i$ from which information is to be reproduced and reflected by the interfacial surface $L_i$ (a reproduction light beam, also referred to as an "interfered light beam"). The thin arrow (the thin solid arrow and the thin dotted arrow in FIG. 4A) represents an interfering light beam that causes multiple interference.

In order to reduce multiple interference, the types of stray light beam that cause multiple interference should be investigated.

One of the stray light beams that possibly cause multiple interference is a light beam reflected an odd number of times. At that time, among light beams reflected an odd number of times, a light beam reflected five times or more does not induce a variation in the light intensity that causes a practical problem of obtaining a reproduction signal by a detector, since the light intensity is attenuated each time the light beam is reflected by one of the interfacial surfaces L. Therefore, only a stray light beam that is reflected three times is taken into account in order to reduce multiple interference.

In addition, a stray light beam that travels via an interfacial surface located on the lower side of the interfacial surface from which information is reproduced has an optical length that is longer than that of the interfered light beam. Accordingly, even a stray light beam reflected three times, among the stray light beams that cause multiple interference, is excluded if the stray light beam travels via an interfacial surface located on the lower layer side of the interfacial surface from which information is reproduced.

As can be seen from the above description, in order to reduce multiple interference, it is desirable that the occurrence of a stray light beam that is reflected three times and that travels via the interfacial surface located on the upper side of the interfacial surface L from which information is reproduced (hereinafter referred to as an "interfacial surface Lj") be reduced. Ideally, it is desirable that the occurrence of all of such stray light beams be prevented.

The stray light beam that is reflected three times and that causes a practical problem is discussed below.

In the case illustrated in FIG. 4A, the stray light beam that is reflected by the interfacial surface L6, the interfacial surface L8, and the interfacial surface L2 (indicated as a thin solid arrow) and the stray light beam that is reflected by the interfacial surface L2, the interfacial surface L8, and the interfacial surface L6 (indicated as a thin dotted arrow) induce the problem.

In such a case illustrated in FIG. 4A, the reproduction target interfacial surface Lj is represented as the interfacial surface L0, and the spacer thickness S1+S2=S7+S8. That is, the optical path length of each of the above-described two stray light beams that are reflected three times is equal to the optical path length of the interfered light beam and, therefore, multiple interference that causes a practical problem occurs.

At that time, let Lk, Ll, and Lm denote the interfacial surfaces through which the stray light beam that is reflected three times passes from the lower layer side. Then, the stray light beam that is reflected three times shown in FIG. 4A is generated when the light beam travels via three interfacial surfaces: Lk (or Ll) to Lm to Ll (or Lk).

In contrast, in the case illustrated in FIG. 4B, among the three consecutive interfacial surfaces, the distance between the interfacial surfaces $L_{i-1}$ and $L_i$ is the same as the distance between the interfacial surfaces $L_i$ and $L_{i+1}$. That is, a spacer thickness $S_i$ between the interfacial surfaces $L_{i-1}$ and $L_i$ is the same as the thickness of a spacer $S_{i+1}$ between the interfacial surfaces $L_i$ and $L_{i+1}$. In such a case, when, among the three interfacial surfaces $L_{i-1}$, $L_i$, and $L_{i+1}$, information is reproduced from the lowermost interfacial surfaces $L_{i-1}$, a stray light beam that is reflected three times between the interfacial surfaces $L_i$ and $L_{i+1}$ (a stray light beam that travels via the interfacial surfaces $L_i$ to $L_{i+1}$ to $L_i$) may be generated. The stray light beam causes a practical problem.

That is, in order to reduce the occurrence of multiple interference that causes a practical problem, it is necessary to design the individual spacer thicknesses while taking into account the occurrence of such a stray light beam that is reflected three times by the interfacial surfaces $L_j$, $L_{i+1}$, and $L_i$.

At that time, the three-times-reflected stray light beam that travels via two interfacial surfaces L in the case illustrated in FIG. 4B can be considered as the three-times-reflected stray light beam that travels via three interfacial surfaces L in the case illustrated in FIG. 4A (the stray light beam that travels via three interfacial surfaces: Lk (or Ll) to Lm to Ll (or Lk)) when the interfacial surface Lk is the same as the interfacial surface Ll.

From this point of view, hereinafter, for a stray light beam that should be taken into account in order to prevent multiple interference that could possibly cause a practical problem, the following descriptions can be used so that the description of the three-times-reflected stray light beam that travels via three interfacial surfaces, as shown in FIG. 4A, and the description of the three-times-reflected stray light beam that travels via only two interfacial surfaces, as shown in FIG. 4B, are the same.

That is, under the condition: k≦l<m, the description "three-times-reflected stray light beam that travels via the interfacial surfaces Lk (or Ll) to Lm to Ll (or Lk)" is used.

By using the condition: k≦l<m, the description "three-times-reflected stray light beam that travels via the interfacial surfaces: Lk (or Ll) to Lm to Ll (or Lk))" can include the meaning of the three-times-reflected stray light beam that travels via the interfacial surfaces Lk to Lm to Lk. Accordingly, the stray light beam that is reflected three times between two interfacial surfaces, as in the case illustrated in FIG. 4B, can be also included.

At that time, a stray light beam that is reflected three times and that should be taken into account in order to prevent the occurrence of multiple interference that could possibly causes a practical problem is only a stray light beam that travels via the interfacial surface L located on the upper side of the reproduction target interfacial surface Lj, as described above. Accordingly, the condition: j<k≦l<m is used.

2-2 Design Guide for Effectively Reducing Multiple Interference

When, as described above, a three-times-reflected stray light beam that travels via the interfacial surfaces: Lk (or Ll) to Lm to Ll (or Lk)) and that is taken into account in order to prevent the occurrence of multiple interference that causes a practical problem, that is, a three-times-reflected stray light beam that travels via the interfacial surfaces located on the upper layer side of the reproduction target interfacial surface Lj is expressed as a "three-times-reflected stray light beam that travels via the interfacial surfaces: Lk (or Ll) to Lm to Ll (or Lk))" under the condition "j<k≦l<m", the sum of the thicknesses of spacers between the neighboring interfacial surfaces formed between the interfacial surface Lj and Lk is denoted as "$S_{j-k}$". In addition, the sum of the thicknesses of spacers between the neighboring interfacial surfaces formed between the interfacial surface Ll and Lm is denoted as "$S_{l-m}$".

Then, if the absolute difference between $S_{j-k}$ and $S_{l-m}$ is zero (as shown in FIGS. 4A and 4B), the optical path length of the "three-times-reflected stray light beam that travels via the interfacial surfaces: Lk (or Ll) to Lm to Ll (or Lk))" is equal to the optical path length of the interfered light beam that travels via the interfacial surface Lj. Therefore, these two beams interfere with each other on the detector.

As can be seen from the above-described description, by making $S_{j-k}$ different from $S_{l-m}$ by a certain value, the occurrence of interfering light beam that causes a practical problem can be completely prevented.

According to the present embodiment, when recording and reproduction is performed, the wavelength of the recording/reproduction laser beam=about 405 nm, and the numerical aperture (the effective numerical aperture for the recording/reproduction laser beam) of the objective lens 16=about 0.85. In addition, the index of refraction of the spacer is about 1.6. Experiments indicate that, under such conditions (the same as those for a BD), the occurrence of a three-times-reflected stray light beam that causes a practical problem can be prevented by setting the above-described difference ($S_{j-k}$–$S_{l-m}$) to at least 1 μm (i.e., at least a 2-μm distance difference for a round trip), since the amplitude intensity of the three-times-reflected stray light beam per unit area of the detector can be decreased.

That is, by setting the thicknesses of the spacers so that at least the condition:

$$|S_{j-k} - S_{l-m}| > 1 \mu m$$

is satisfied, the occurrence of a three-times-reflected stray light beam that causes a practical problem can be prevented.

If the above-described condition is satisfied, an ideal state in which when information is reproduced from any one of the interfacial surfaces $L_j$, the number of occurrences of a three-times-reflected stray light beam that travels via the interfacial surfaces Lk (or Ll) to Lm to Ll (or Lk) is zero can be obtained.

As described above, complete prevention of the occurrence of a three-times-reflected stray light beam that causes a practical problem is ideal for improving the reproduction performance. However, practically, it is significantly difficult to completely prevent the occurrence of such a stray light beam.

That is, in order to satisfy the condition: $|S_{j-i} - S_{l-m}| > 1$ μm, it is necessary that any two of the spacers among the spacers disposed between all the neighboring interfacial surfaces $L_i$ have a difference in thickness greater than 1 μm. At that time, it is significantly difficult to reduce the entire thickness of the multilayer optical recording medium when the number of layers is increased. More specifically, let Stot denote the total thickness of all of the spacers, N denote the total number of the interfacial surfaces L, and Smin denote the minimum thickness of the spacer among the spacers formed between the neighboring interfacial surfaces L (N interfacial surfaces). Then, when the condition: $|S_{j-k} - S_{l-m}| > 1$ μm is satisfied, the following condition is satisfied:

$$Stot > Smin \times (N-1) + 1 \mu m \times (N-2)^2 / 2.$$

This expression is derived from the area of a figure formed when each of the (N−1) spacers is considered to be a rectangle having long sides equal to the thickness of the spacer and short sides of 1 and the rectangles are arranged in ascending order of the long sides. This figure includes a rectangle having an area of Smin×(N−1) and a triangle having an area of 1 μm×(N−2)²/2 on top of the rectangle.

Note that "Smin" represents the minimum thickness of the spacer set for preventing crosstalk between the neighboring layers. For example, Smin is set to about 10 μm.

As described above, in order to completely prevent the occurrence of a three-times-reflected stray light beam that causes a practical problem, the total thickness of all of the spacers Stot, that is, the range in the depth direction in which a mark for recording and reproduction is formed is significantly increased.

If the thickness Stot is increased, the range in the depth direction in which a mark for recording and reproduction is formed is increased. The increase in the range makes it difficult to appropriately correct spherical aberration occurring on each of the recording films Lrc. Thus, it is significantly difficult to put the multilayer optical recording medium 1 into practical use. In particular, the number of the recording films Lrc is increased to several tens of layers, as shown in the multilayer optical recording medium 1 in FIG. 1, the total thickness Stot is significantly increased and, therefore, it is significantly difficult to put the multilayer optical recording medium 1 into practical use.

However, it is not indispensable that the occurrence of multiple interference is completely prevented. The occurrence of multiple interference is allowable if practical reproduction performance can be ensured.

Accordingly, in the present embodiment, the occurrences of a "three-times-reflected stray light beam that travels via the interfacial surfaces Lk (or Ll) to Lm to Ll (or Lk)" is not completely prevented, but the occurrence is maximally prevented.

The spacer thickness design guide based on this principal of the present embodiment is described below.

The important factors for preventing multiple interference include the light intensity of the interfering light beam reaching the detector in addition to the number of occurrences of a three-times-reflected stray light beam that travels via the interfacial surfaces Lk (or Ll) to Lm to Ll (or Lk).

To estimate the light intensity of the interfering light beam, it is necessary to estimate the reflectance and transmittance of each of the interfacial surfaces $L_j$.

In general, for multilayer optical recording media, design is made so that the interfacial surfaces $L_i$ have the same effective reflectance by adjusting the reflectance and transmittance of each of the recording films Lrc when information is reproduced from the recording film Lrc. However, in an actual design phase, the effective reflectance is determined by including all of the stray light beams output from the other recording films Lrc (the other interfacial surfaces L). Accordingly, it is natural to presume that the true effective reflectance determined after removing such stray light beams becomes lower the further the recording film Lrc is located toward the lower layer side. In contrast, the true effective reflectance becomes higher the further the recording film Lrc is located toward the upper layer side.

Note that for simplicity, hereinafter, the effective reflectance is computed without the effect of such stray light beams.

In addition, in general, when a plurality of thin films serving as the recording films Lrc are used and if some of the thin films absorb light, the reflectance (and the absorptance) varies in accordance with a direction in which the light travels. In contrast, the transmittance is constant regardless of the direction in which the light travels. This is because the order of arrangement of the thin films is reversed for light when the light travels in different directions with respect to the recording film Lrc.

In this way, when estimating the intensity of an interfering light beam, a difference in the reflectance in accordance with the direction in which the light travels should be taken into account.

For the energy reflectance r of the interfacial surface $L_i$ alone (hereinafter also referred to as an "interfacial surface energy reflectance"), let ri denote the interfacial surface energy reflectance on the light incident side (on the upper layer side). Let $\tilde{r}i$ denote the interfacial surface energy reflectance on the light reflection side (on the lower layer side). In addition, let ti denote the energy transmittance of the interfacial surface $L_i$, and Ri denote the effective energy reflectance of the interfacial surface $L_i$ of the multilayer optical recording medium. Then, Ri is expressed as follows:

$$Ri = ri \times t_{i+1}^2 \times t_{i+2}^2 \ldots \times t_{N-1}^2 \times t_N^2.$$

Since the effective energy reflectance values of any two of the interfacial surfaces Lj and Lk (the practical effective reflectance values including a stray light component) are the same, the following expression can be given:

$$Rj \approx Rk (j < k < N-1).$$

According to this design, as the interfacial surface $L_i$ comes to be located closer to the light incident side (i.e., as i of $L_i$ is larger), the interfacial surface energy reflectance ri decreases and the energy transmittance ti increases.

Under the above-described assumption, the light intensity of a three-times-reflected light beam that travels via the interfacial surfaces Lk (or Ll) to Lm to Ll (or Lk) is discussed.

Such a three-times-reflected light beam R(klm) is expressed as follows:

$$\begin{aligned}R(klm) &= r_k \times t_{k+1}^2 \times t_{k+2}^2 \ldots \times t_{N-1}^2 \times t_N^2 \times \\ &\quad r_l \times \tilde{r}m \times t_{l+1}^2 \times t_{l+2}^2 \ldots \times t_{m-1}^2 \\ &= Rk \times \tilde{r}m \times r_l \times t_{l+1}^2 \times t_{l+2}^2 \ldots \times t_{m-1}^2 \\ &\approx Rk \times \tilde{r}m \times rm - 1 \\ &= Rj \times \tilde{r}m \times (rm/tm^2) \\ &= Rj \times (\tilde{r}m \times rm)/tm^2\end{aligned}$$

When the three-times-reflected light beam satisfies the interference condition for a reproduction light beam reflected by the interfacial surface Lj once (i.e., when the difference in the optical path length <2 μm), a light intensity variation (Max) caused by the interference of the three-times-reflected light beam is expressed as follows:

$$\pm 2\sqrt{Ri} \times \sqrt{R(klm)} = \pm 2\sqrt{Ri} \times \sqrt{Ri\left(\frac{\tilde{r}mrm}{tm^2}\right)} \bigg/ \quad [\text{Math. 1}]$$

$$\left(Ri + Ri\left(\frac{\tilde{r}mrm}{tm^2}\right)\right)$$

$$= \frac{\pm 2\sqrt{\tilde{r}mrm} \times tm}{\tilde{r}mrm + tm^2}$$

The above expression (Math. 1) indicates that the effect of the interference of the three-times-reflected light beam R(klm) is determined by the energy reflectance values rm and $\tilde{r}$m and the energy transmittance value tm of an interfacial surface Lm located on the uppermost layer side. More specifically, the effect of the interference of the three-times-reflected light beam R(klm) decreases as the energy reflectance values rm and $\tilde{r}$m of the interfacial surface Lm decrease and the energy transmittance value tm of the interfacial surface Lm increases.

This indicates that the effect of interference decreases the further the interfacial surface Lm is located toward the upper layer side when a normal design method is employed in which the effective energy reflectance values of the individual interfacial surfaces $L_i$ are the same.

As can be seen from the above description, in order to prevent multiple interference, it is desirable that the interfacial surface Lm, which is located on the uppermost layer side among the interfacial surfaces Lk, Lm, and $L_i$ that generate the three-times-reflected light beam R(klm), be placed as far toward the upper layer side as possible. That is, if the interfacial surface Lm is located on the lower layer side, a serious variation in the light intensity arises. As a result, the reproduction performance may be significantly degraded.

Accordingly, one of the design guides for preventing multiple interference is that at least the interfacial surface Lm is not to be located on the possible lowermost layer side. This is to prevent the spacer thickness S1 of the spacer 4 between the interfacial surface L0 located on the lowermost layer and the interfacial surface L1 from being the same as the spacer thickness S2 of the spacer 4 disposed between the interfacial surfaces L1 and L2 and located immediately above the spacer 4 having the spacer thickness S1 (i.e., the interfacial surface Lm=the interfacial surface L2). That is, at least two spacers 4 sequentially arranged on the lowermost layer side should have different thicknesses.

As described above, a first guideline of the design guide in which the occurrence of a three-times-reflected light beam R(klm) is allowable is:

1) Make at least two spacers sequentially arranged on the lowermost layer side have different thicknesses.

In addition, although the occurrence of a three-times-reflected light beam R(klm) is allowed, it is desirable that the number of the occurrences be minimized.

As indicated by FIGS. 4A and 4B, as a pattern in which a three-times-reflected light beam R(klm) is generated, the pattern of FIG. 4B in which one three-times-reflected light beam R(klm) is generated is more preferable than that of FIG. 4A in which two three-times-reflected light beams R(klm) are generated.

Accordingly, a second guideline of the design guide is:

2) Although it is allowed that spacers having the same thickness (including the thickness of a plurality of spacers) are sequentially arranged, maximally avoid the case in which portions of the spacers having the same thickness are separately arranged.

2-3 Technique for Setting Thickness of Spacer According to Embodiment

A particular technique for setting the thickness of a spacer according to the present embodiment is described next.

Hereinafter, in order to verify the correctness of the above-described guide lines, comparative structures 1 to 4 are shown and, thereafter, a particular example of setting the spacer thickness according to the present embodiment is described.

Like the multilayer optical recording medium 1 according to the present embodiment, in the comparative structures described below, the number N of the interfacial surfaces L=24. A substrate is formed on the lower layer side of the interfacial surface L0, which is the lowermost interfacial surface. In addition, a cover is formed on the upper layer side of the interfacial surface L23, which is the uppermost interfacial surface.

Figure 5:
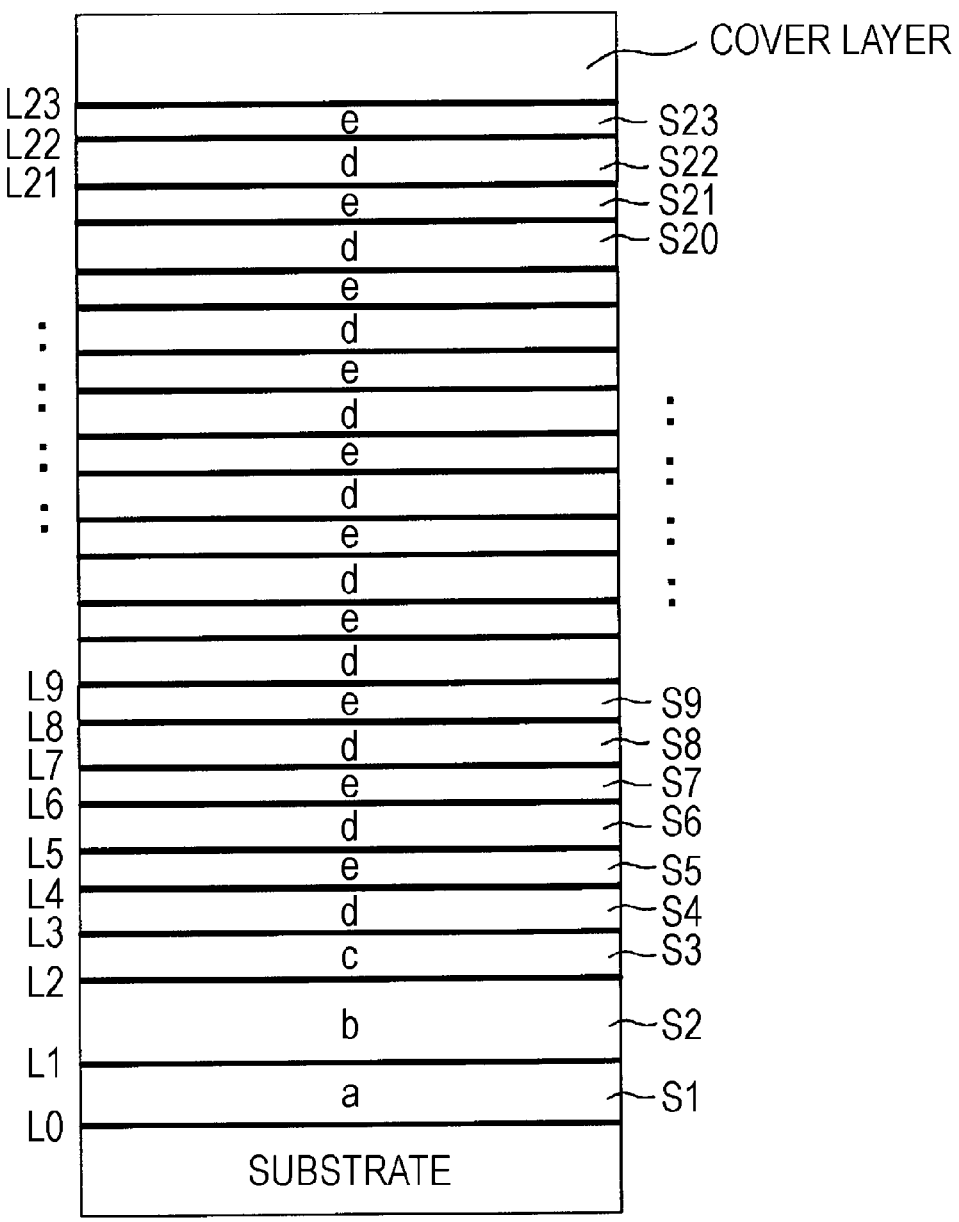
FIG. 5 illustrates an example of setting of a spacer thickness in a comparative structure 1.

FIG. 5 illustrates an example of setting of the spacer thickness in the comparative structure 1.

In this comparative structure 1 and the comparative structures 2 to 4 described below and the structure according to the present embodiment, the number of the interfacial surfaces L is relatively large (N=24). Accordingly, the three spacer thicknesses S1, S2, and S3 of the spacers sequentially arranged on the lowermost layer side are set to different values.

Suppose that the three spacer thicknesses S1, S2, and S3 are set to a, b, and c, respectively (a≠b, a≠c, and b≠c).

As shown in FIG. 5, in the comparative structure 1, above a unit in which spacers having thicknesses of a, b, and c are sequentially arranged (hereinafter referred to as a "different thickness layer unit", two types of spacer having thicknesses of d and e (each different from a) are alternately arranged.

That is, the arrangement is expressed as follows:
substrate/a/b/c/d/e/d/e/d/e/d/e/d/e/d/e/d/e/d/e/cover layer,
where "/" corresponds to the interfacial surface $L_i$ and indicates L0, L1 . . . , L23 starting from the substrate.

In this example, for simplicity, each of (a+b) and (a+b+c) is not equal to any one of d, d+e, 2d+e, 2d+2e, . . . , and 10d+10e. This relationship can be easily satisfied by setting a to e so that a to e are numbers that are relatively prime.

When such a relationship is satisfied, the number of the interfering light beams occurring on the interfacial surfaces L0 to L2 during a reproduction operation is zero due to the presence of the above-described different thickness layer unit.

In this case, the number of the interfering light beams occurring on each of the interfacial surfaces L3 to L23 during a reproduction operation can be counted as follows:

(The Interfacial Surface L3)

number of the interfering light beams due to the presence of the spacers that are the same as d between L3 and L4 (e.g., the spacers between L5 and L6 and between L7 and L8)=18, number of the interfering light beams due to the presence of the spacers that are the same as d+e between L3 and L5 (e.g., the spacers between L5 and L7 and between L6 and L8)=33, number of the interfering light beams due to the presence of the spacers that are the same as 2d+e between L3 and L6=14, number of the interfering light beams due to the presence of the spacers that are the same as 2d+2e between L3 and L7=25, number of the interfering light beams due to the presence of the spacers that are the same as 3d+2e between L3 and L8=10, number of the interfering light beams due to the presence of the spacers that are the same as 3d+3e between L3 and L9=17, number of the interfering light beams due to the presence of the spacers that are the same as 4d+3e between L3 and L10=6, number of the interfering light beams due to the presence of the spacers that are the same as 4d+4e between L3 and L11=9, number of the interfering light beams due to the presence of the spacers that are the same as 5d+4e between L3 and L12=2, and number of the interfering light beams due to the presence of the spacers that are the same as 5d+5e between L3 and L13=1, which is 135 in total.

(The Interfacial Surface L4)

number of the interfering light beams due to the presence of the spacers that are the same as e between L4 and L5 (e.g., the spacers between L5 and L7 and between L6 and L8)=18, number of the interfering light beams due to the presence of the spacers that are the same as d+e between L4 and L6=31, number of the interfering light beams due to the presence of the spacers that are the same as d+2e between L4 and L7=14, number of the interfering light beams due to the presence of the spacers that are the same as 2d+2e between L4 and L8=23,

. . .

number of the interfering light beams due to the presence of the spacers that are the same as 4d+5e between L4 and L13=2, which is 126 in total.

Similarly, the number of the interfering light beams on the interfacial surface L5 is 108 in total . . . . The number of the interfering light beams on the interfacial surface L18 is 7 in total. The number of the interfering light beams on the interfacial surface L19 is 3 in total. The number of the interfering light beams on the interfacial surface L20 is 2 in total. The number of the interfering light beams on each of the interfacial surfaces L21 to L23 is 0 in total.

In the comparative structure 1, self-similarity appears in the repetition of the spacer thicknesses d/e/d/e .... Accordingly, even when any portion is cut off, the same thicknesses appear in the other portion. That is, the number of combinations of k, l, and m for which the differences in the optical path length of a three-times reflected light beam that travels via the interfacial surfaces Lk (or Ll) to Lm to Ll (or Lk) with respect to the interfacial surfaces Lj are the same is significantly large. In particular, as the reproduction target interfacial surface Lj is located on the lower side, the numbers of corresponding l and m become large even when the distance between j and k is large.

As a result, if the comparative structure 1 is employed, it is difficult to effectively reduce the number of the interfering light beams.

Figure 6:
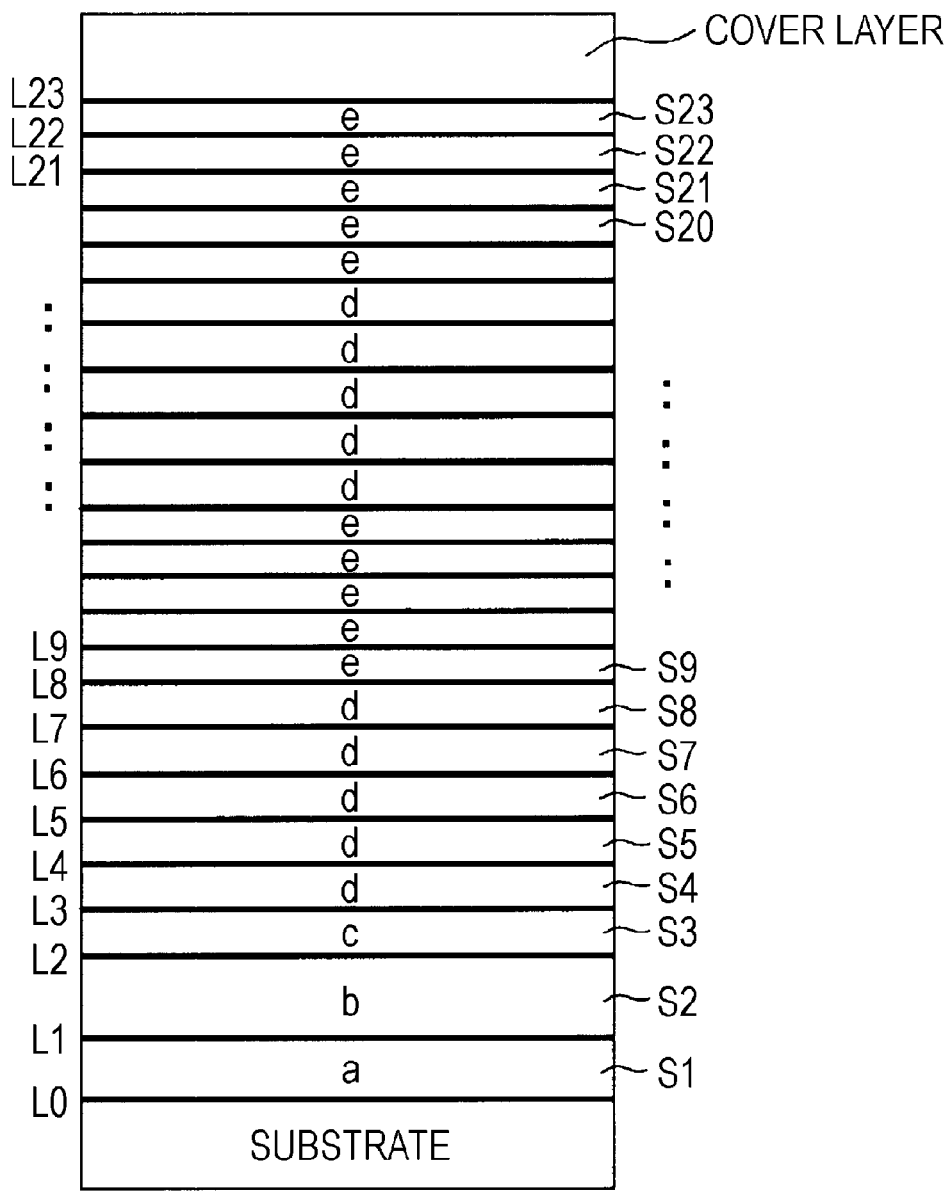
FIG. 6 illustrates an example of setting of a spacer thickness in a comparative structure 2.

FIG. 6 illustrates an example of setting of the spacer thickness in the comparative structure 2.

In the comparative structure 2, five spacers each having a thickness of d and five spacers each having a thickness of e are alternately stacked (here, a to e are also numbers that are relatively prime). That is, the arrangement is expressed as follows:

substrate/a/b/c/d/d/d/d/e/e/e/e/d/d/d/d/e/e/e/e/cover layer.

As in the comparative structure 1, in the comparative structure 2, the number of the interfering light beams occurring when information on each of the interfacial surfaces L3 to L23 is reproduced can be counted as follows (note that the number of the interfering light beams occurring on the interfacial surfaces L0 to L2 during a reproduction operation is zero):

(The Interfacial Surface L3)
number of the interfering light beams due to the presence of the spacers that are the same as d between L3 and L4=17,
number of the interfering light beams due to the presence of the spacers that are the same as 2d between L3 and L5=11,
number of the interfering light beams due to the presence of the spacers that are the same as 3d between L3 and L6=6,
number of the interfering light beams due to the presence of the spacers that are the same as 4d between L3 and L7=4,
number of the interfering light beams due to the presence of the spacers that are the same as 5d between L3 and L8=2,
number of the interfering light beams due to the presence of the spacers that are the same as 5d+e between L3 and L9=4,
number of the interfering light beams due to the presence of the spacers that are the same as 5d+2e between L3 and L10=6,
number of the interfering light beams due to the presence of the spacers that are the same as 5d+3e between L3 and L11=5,
number of the interfering light beams due to the presence of the spacers that are the same as 5d+4e between L3 and L12=3, and
number of the interfering light beams due to the presence of the spacers that are the same as 5d+5e between L3 and L13=1, which is 59 in total.

Similarly, the number of the interfering light beams on the interfacial surface L4 is 48 in total. The number of the interfering light beams on the interfacial surface L5 is 41 in total. The number of the interfering light beams on the interfacial surface L18 is 10 in total. The number of the interfering light beams on the interfacial surface L19 is 6 in total. The number of the interfering light beams on the interfacial surface L20 is 3 in total. The number of the interfering light beams on the interfacial surface L21 is 1 in total. The number of the interfering light beams on each of the interfacial surfaces L22 and L23 is 0 in total.

In the comparative structure 2, the total of the spacer thicknesses is the same as that in the comparative structure 1. However, since the comparative structure 2 has a thickness biased arrangement including consecutive d's and consecutive e's and, therefore, the self-similarity of the comparative structure 1 is disturbed in the comparative structure 2, the comparative structure 2 can reduce the number of the interfering light beams, as compared with the comparative structure 1. However, since the absolute number of the thicknesses d and e is large (10 for each), the number of the interfering light beams is not reduced when the reproduction target interfacial surface Lj is located on the lower layer side and if the distance between j and k is small (e.g., in the case of k=j+1 or k=j+2).

Figure 7:
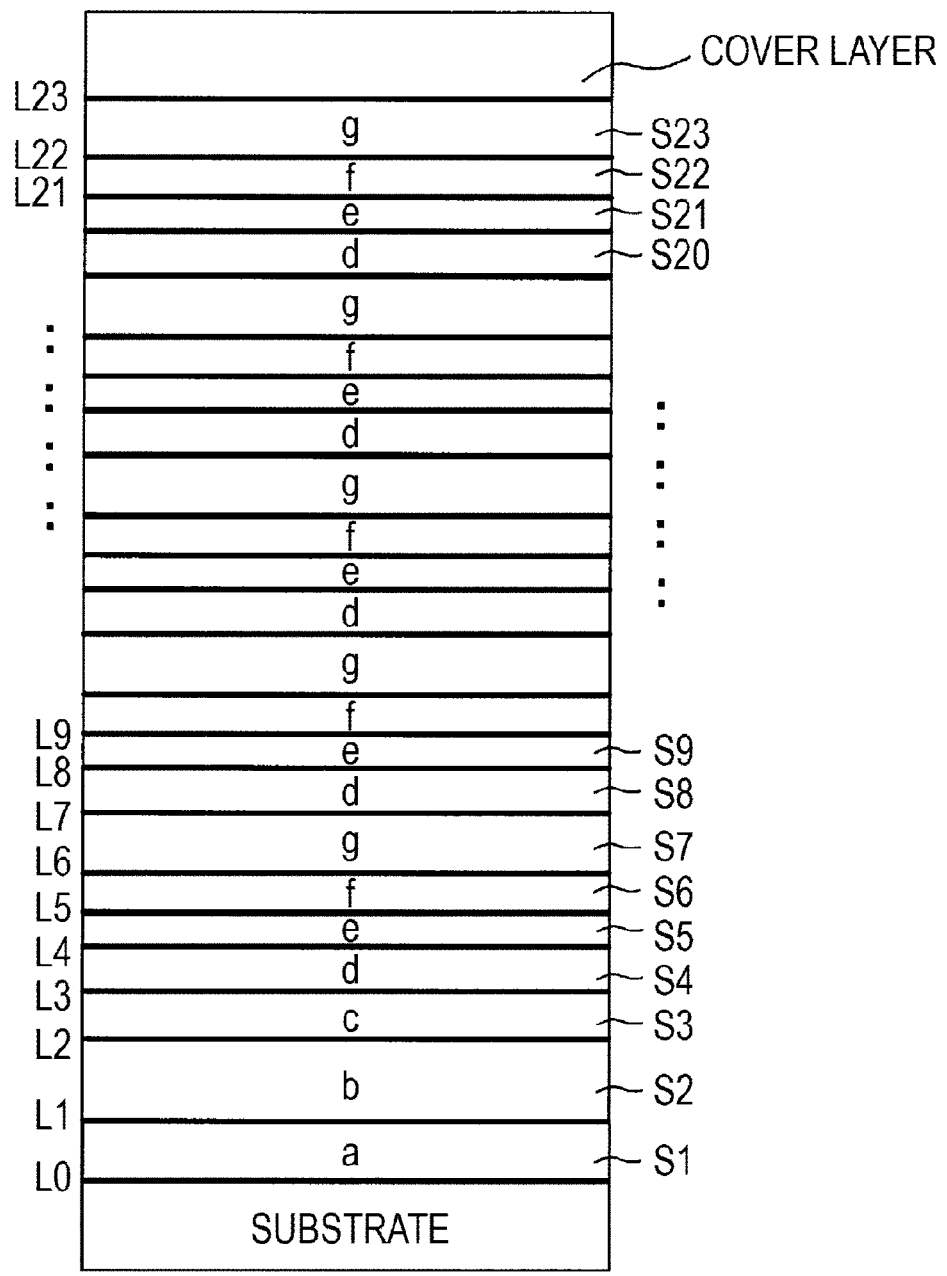
FIG. 7 illustrates an example of setting of a spacer thickness in a comparative structure 3.

FIG. 7 illustrates an example of setting of the spacer thickness in the comparative structure 3.

In the comparative structure 3, spacers having thicknesses of d, e, f, and g are repeatedly stacked (here, a to g are numbers that are relatively prime). More specifically, the arrangement is expressed as follows:

substrate/a/b/c/d/e/f/g/d/e/f/g/d/e/f/g/d/e/f/g/cover layer.

As in the above-described comparative structures, in the comparative structure 3, the number of the interfering light beams occurring when reproducing information on the interfacial surfaces L3 to L23 can be counted as follows:

(The Interfacial Surface L3)
number of the interfering light beams due to the presence of the spacers having d between L3 and L4=8,
number of the interfering light beams due to the presence of the spacers having d+e between L3 and L5=8,
number of the interfering light beams due to the presence of the spacers having d+e+f between L3 and L6=8,
number of the interfering light beams due to the presence of the spacers having d+e+f+g between L3 and L7=25,
number of the interfering light beams due to the presence of the spacers having 2d+e+f+g between L3 and L8=4,
number of the interfering light beams due to the presence of the spacers having 2d+2e+f+g between L3 and L9=4,
number of the interfering light beams due to the presence of the spacers having 2d+2e+2f+g between L3 and L10=4, and
number of the interfering light beams due to the presence of the spacers having 2d+2e+2f+2g between L3 and L11=9, which is 70 in total.

Similarly, the number of the interfering light beams on the interfacial surface L4 is 66 in total. The number of the interfering light beams on the interfacial surface L5 is 58 in total. The number of the interfering light beams on the interfacial surface L17 is 4 in total. The number of the interfering light beams on the interfacial surface L18 is 2 in total. The number of the interfering light beams on each of the interfacial surfaces L19 to L23 is 0 in total.

Figure 8:
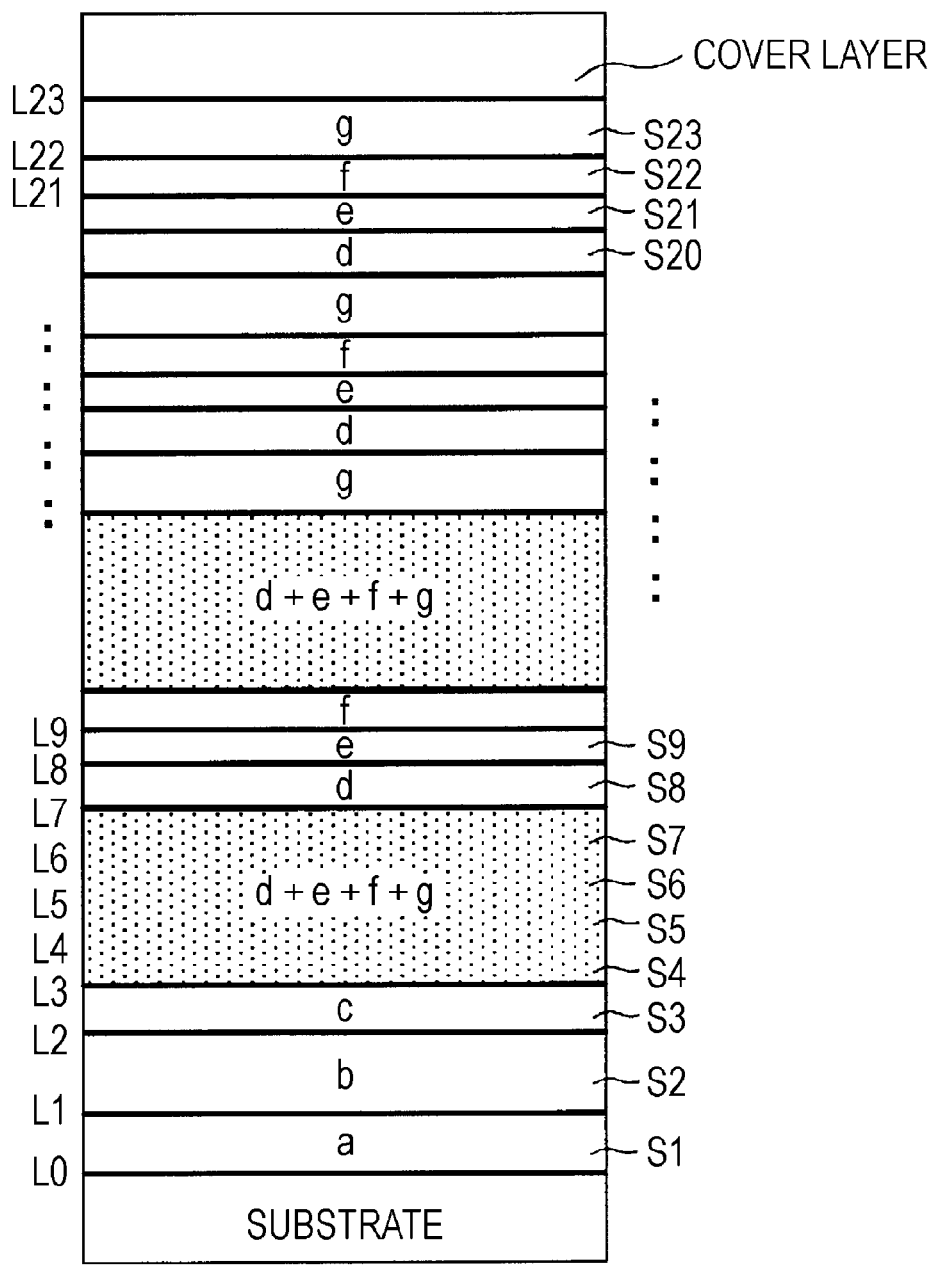
FIG. 8 illustrates the self-similarity of the comparative structure 3.

In the comparative structure 3, since the number of the types of spacer is increased to 4, the regularity is not so strict, as compared with the comparative structure 1. However, the comparative structure 3 is still significantly self-similar. Thus, the number of the interfering light beams is not reduced. In particular, in the case in which (d+e+f+g) appears between j and k as between L3 and L7, even when any portion is cut off, the same thickness exists in the other portion (refer to FIG. 8). Accordingly, the number of interfering light beams is increased.

Figure 9:
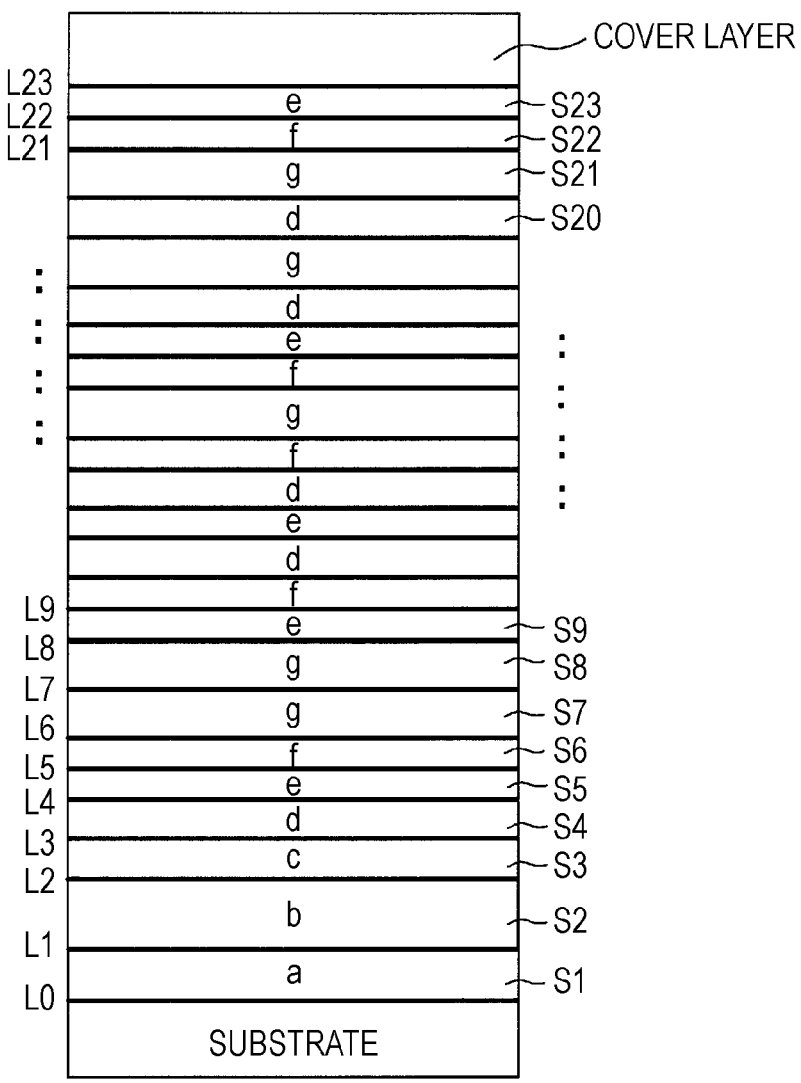
FIG. 9 illustrates an example of setting of a spacer thickness in a comparative structure 4.

FIG. 9 illustrates an example of setting of the spacer thickness in the comparative structure 4.

In the comparative structure 4, the regularity of the comparative structure 3 is disturbed, and fluctuations occur. More specifically, the arrangement is expressed as follows:

substrate/a/b/c/d/e/f/g/e/f/d/e/d/f/g/f/e/d/g/d/g/f/e/cover layer.

The number of the interfering light beams in the comparative structure 4 can be counted as follows:
(The Interfacial Surface L3)

number of the interfering light beams due to the presence of the spacers that are the same as d between L3 and L4=8, number of the interfering light beams due to the presence of the spacers that are the same as d+e between L3 and L5=4, number of the interfering light beams due to the presence of the spacers that are the same as d+e+f between L3 and L6=8, number of the interfering light beams due to the presence of the spacers that are the same as d+e+f+g between L3 and L7=9, number of the interfering light beams due to the presence of the spacers that are the same as d+e+f+2g between L3 and L8=6, number of the interfering light beams due to the presence of the spacers that are the same as d+2e+f+2g between L3 and L9=0, number of the interfering light beams due to the presence of the spacers that are the same as d+2e+2f+2g between L3 and L10=0, and number of the interfering light beams due to the presence of the spacers that are the same as 2d+2e+2f+2g between L3 and L11=3, which is 38 in total.

Similarly, the number of the interfering light beams on the interfacial surface L4 is 19 in total. The number of the interfering light beams on the interfacial surface L5 is 18 in total. The number of the interfering light beams on the interfacial surface L17 is 3 in total. The number of the interfering light beams on the interfacial surface L18 is 2 in total. The number of the interfering light beams on each of the interfacial surfaces L19 to L23 is 0 in total.

In the comparative structure 4, the number of interfering light beams can be relatively significantly reduced, as compared with the comparative structure 3. However, a relatively large number of interfering light beams are generated for the interfacial surface L on the lower layer side, which is problematic.

Figure 10:
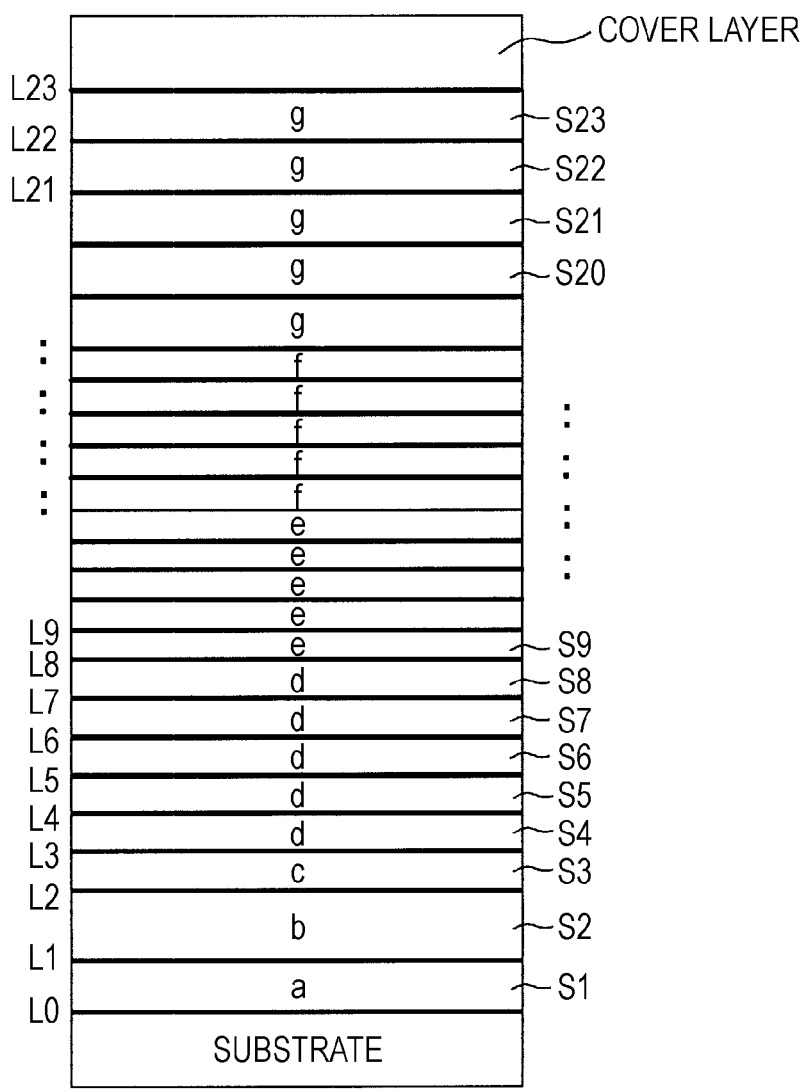
FIG. 10 illustrates an exemplary structure according to the embodiment.

FIG. 10 illustrates an exemplary structure (an example of setting of the spacer thicknesses) according to the present embodiment.

According to the present embodiment, the exemplary structure is expressed as follows:

substrate/a/b/c/d/d/d/d/d/e/e/e/e/e/f/f/f/f/f/g/g/g/g/g/cover layer.

The key points of the exemplary structure according to the present embodiment are described below.

[1] The thicknesses of three spacers arranged in the lowermost layer portion are set to different values (a≠b, and b≠c). That is, the above-described guideline 1) is applied. Hereinafter, the lowermost layer portion in which the spacer thicknesses are different from one another is referred to as a "different thickness layer unit".

[2] An equal-thickness layer unit in which a plurality of spacers each having a thickness different from any one of a, b, and c are sequentially arranged is provided as an upper layer of the different thickness layer unit. More specifically, in this case, the equal-thickness layer unit includes a spacer having a thickness of d, a spacer having a thickness of e on the spacer having a thickness of d, a spacer having a thickness of f on the spacer having a thickness of e, a spacer having a thickness of f on the spacer having a thickness of e, and a spacer having a thickness of f on the spacer having a thickness of e. At that time, the thicknesses a, b, c, d, e, f, and g are different from one another.

[3] An equal-thickness layer unit includes a limited number of spacers sequentially arranged. For example, in this case, the number of spacers sequentially arranged is limited to 5.

[4] In the equal-thickness layer unit, each of the thickness of the spacer and the total thickness of any number of spacers sequentially arranged at any position is made different from each of the thickness of any one of the spacers and the total thickness of any number of spacers sequentially arranged at any position outside the unit. For example, from a point of the thickness d, each of d, 2d, 3d, 4d, and 5d is different from any one of a, b, c, e, f, g, a+b, a+b+c, b+c, 2e, 3e, 4e, 5e, e+f, 2e+f, 3e+f, 4e+f, 5e+f, e+2f, e+3f, e+4f, e+5f, e+5f+g, . . . , 5e+5f+5g, 2f, 3f, 4f, 5f, f+g, 2f+g, 3f+g, 4f+g, 5f+g, . . . , 5f+5g, 2g, 3g, 4g, and 5g. In addition, from a point of the thickness e, each of e, 2e, 3e, 4e, and 5e is different from any one of a, b, c, d, f, g, a+b, a+b+c, b+c, a+b+c+d, a+b+c+2d, a+b+c+3d, a+b+c+4d, a+b+c+5d, 2d, 3d, 4d, 5d, 2f, 3f, 4f, 5f, f+g, f+2g, f+3g, f+4g, f+5g, 2f+1g, 2f+2g, . . . , 5f+5, 2g, 3g, 4g, and 5g.

Among these key points, limiting of the number of spacers sequentially arranged described in [2] is necessary for reducing the number of the interfering light beams.

Note that the limit number "5" is only an example. When the effect of the interfering light beam is significantly small (e.g., the reflectance thereof is significantly low), the limit number may be increased.

In addition, the condition described in [4] can be relatively easily satisfied by setting a to g so that a to g are numbers that are relatively prime. Note that, in FIG. 10, a to g are also numbers that are relatively prime.

As shown in FIG. 10, in the exemplary structure according to the present embodiment, the number of the interfering light beams on each of the interfacial surfaces L3 to L23 can be counted as follows:
(The Interfacial Surface L3)

number of the interfering light beams due to the presence of the spacers that are the same as d between L3 and L4=7, number of the interfering light beams due to the presence of the spacers that are the same as 2d between L3 and L5=3, and number of the interfering light beams due to the presence of the spacers that are the same as 3d between L3 and L6=0, which is 10 in total.

Similarly, the number of the interfering light beams on the interfacial surface L4 is 6 in total. The number of the interfering light beams on the interfacial surface L5 is 3 in total . . . . The number of the interfering light beams on the interfacial surface L17 is 0 in total. The number of the interfering light beams on the interfacial surface L18 is 10 in total. The number of the interfering light beams on the interfacial surface L19 is 6 in total. The number of the interfering light beams on the interfacial surface L20 is 3 in total. The number of the interfering light beams on the interfacial surface L21 is 1 in total. The number of the interfering light beams on each of the interfacial surfaces L22 to L23 is 0 in total.

According to the exemplary structure of the present embodiment shown in FIG. 10, the number of the types of spacer used outside the different thickness layer unit is increased to 4, and the spacers are arranged so that the same types are arranged together. Accordingly, the self-similarity having a long cycle, in particular, can be disturbed. As a result, the number of the interfering light beam can be significantly reduced from that in any one of the comparative structures.

In addition, since, in particular, spacers having the same thickness can be sequentially arranged, the structure can be significantly simplified. As a result, a multilayer optical recording medium can be manufactured in a simplified way.

Furthermore, since spacers having the same thickness can be sequentially arranged, the total thickness of the multilayer optical recording medium (the cover layer+all of the spacers) can be reduced, as compared with, for example, a structure in which the thicknesses of spacers has a difference larger than 1 μm in order to completely prevent the occurrence of a three-times-reflected interfering light beam. Accordingly, the structure according to the present embodiment is advantageous in terms of optimal correction of spherical aberration.

Figure 11:
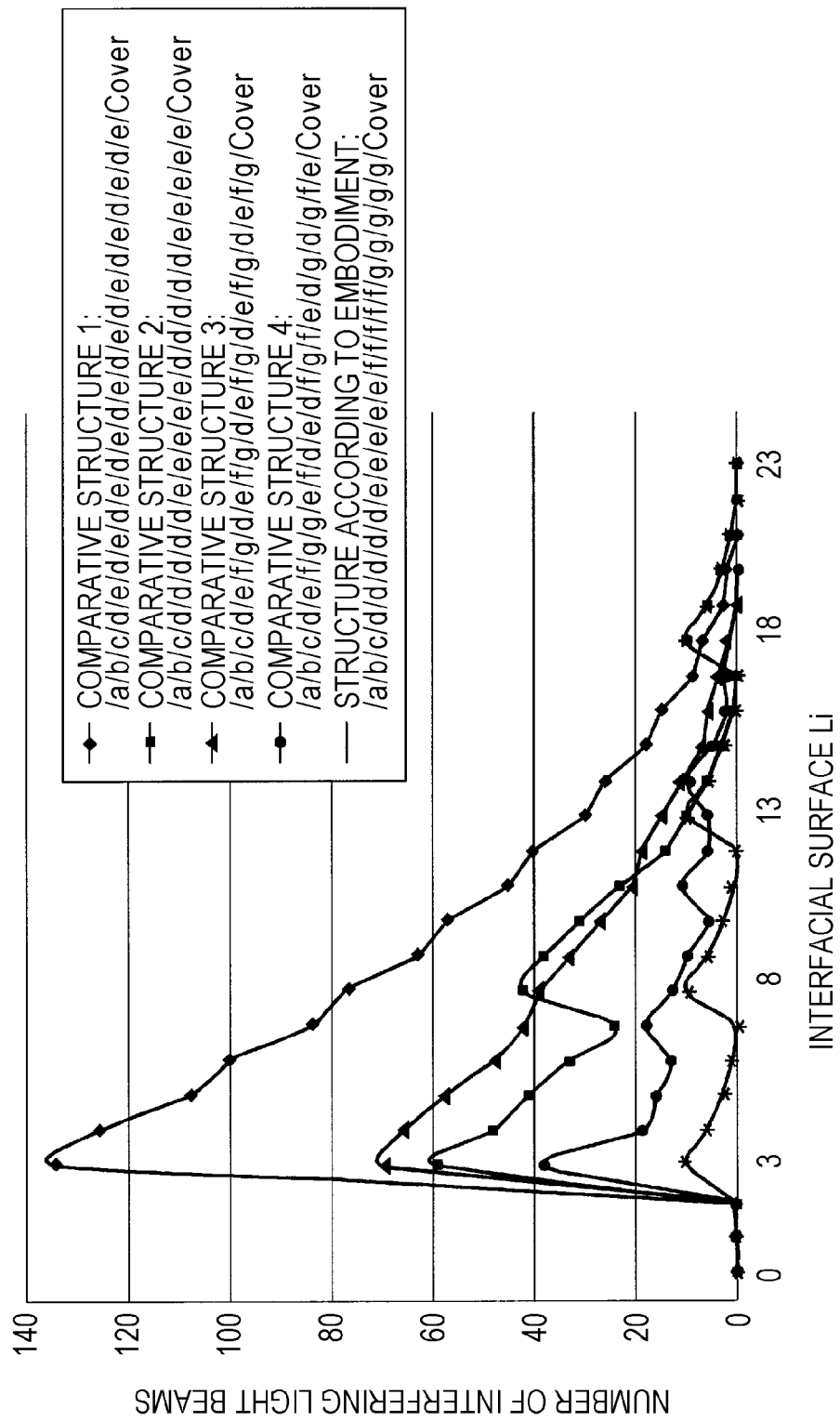
FIG. 11 illustrates comparison of the numbers of interfering light beams in the comparative structures 1 to 4 and the exemplary structure according to the embodiment.

FIG. 11 illustrates comparison of the numbers of interfering light beams in the comparative structures 1 to 4 and the exemplary structure according to the present embodiment.

In FIG. 11, the abscissa represents the interfacial surfaces $L_i$, and the ordinate represents the number of interfering light beams. That is, FIG. 11 shows the number of interfering light beams for each of the interfacial surfaces $L_i$. The plot ♦ indicates the number of interfering light beams for the individual interfacial surfaces $L_i$ in the comparative structure 1. The plot ■ indicates the number of interfering light beams for the individual interfacial surfaces $L_i$ in the comparative structure 2. The plot ▲ indicates the number of interfering light beams for the individual interfacial surfaces $L_i$ in the comparative structure 3. The plot ● indicates the number of interfering light beams for the individual interfacial surfaces $L_i$ in the comparative structure 4. The plot * indicates the number of interfering light beams for the individual interfacial surfaces $L_i$ in the exemplary structure according to the present embodiment.

As can be seen from FIG. 11, in the comparative structure 1, the number of the interfering light beams abruptly increases the further the interfacial surface L is located toward the lower layer side. Note that this abrupt increase toward the lower side is due to the relatively large total number of the interfacial surfaces L (24).

In addition, in the comparative structure 3 in which the number of the types of spacer thickness is increased to 4 and the spacer thicknesses are regularly arranged, the number of the interfering light beams abruptly increases the further the interfacial surface L is located toward the lower layer side, as a whole.

In addition, the comparative structure 2 in which the spacers (d, e) used in the comparative structure 1 are arranged together and the comparative structure 4 in which the regularity of the arrangement of the spacers (d, e, f, g) used in the comparative structure 3 is disturbed can reduce the number of the interfering light beams. However, as compared with the original comparative structures 1 and 3, the comparative structures 2 and 4 do not sufficiently reduce the number of the interfering light beams on the lower layer side.

In contrast, as compared with the comparative structures, the exemplary structure according to the present embodiment can reduce the number of interfering light beams to 10 or less in any layer. Thus, this approach is effective in order to reduce the number of interfering light beam.

In order to accurately estimate the level of multiple interference, the "amplitude intensity" of each of the interfering light beams should be taken into account.

Figure 13A:
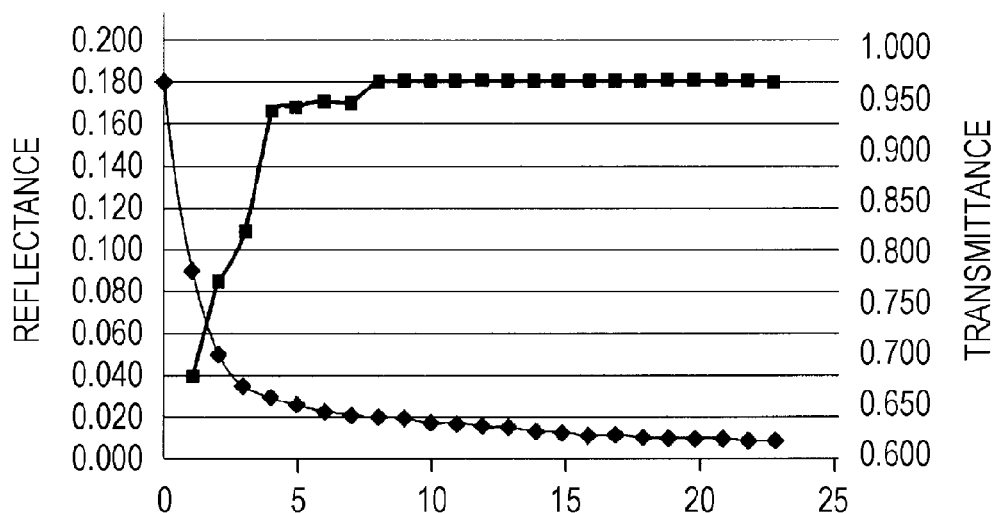
FIGS. 13A and 13B illustrate an example of setting the energy reflectance and the energy transmittance of each of the interfacial surfaces and the effective reflectance of the interfacial surface.
Figure 13B:
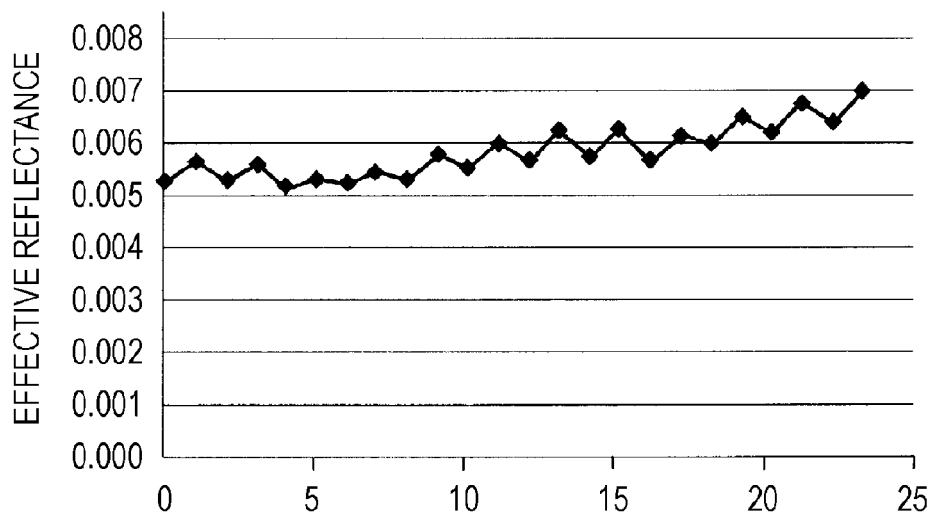

FIGS. 12 and 13A illustrate an example of setting the energy reflectance and energy transmittance of each of 24 interfacial surfaces L. FIG. 13B illustrates the effective reflectance (excluding a stray light beam) of each of the interfacial surfaces L when the energy reflectance and the energy transmittance of each of the interfacial surfaces L are set as shown in FIGS. 12 and 13A.

The effect of multiple interference when the energy reflectance and the energy transmittance are set as shown in FIG. 12 and FIGS. 13A and 13B is estimated below.

Note that for simplicity of calculation, it is assumed that the reflectance values are the same regardless of a direction in which the light beam travels. In addition, only interference between an interfered light beam (a main signal light beam) and the interfering light beam is taken into account.

Figure 14:
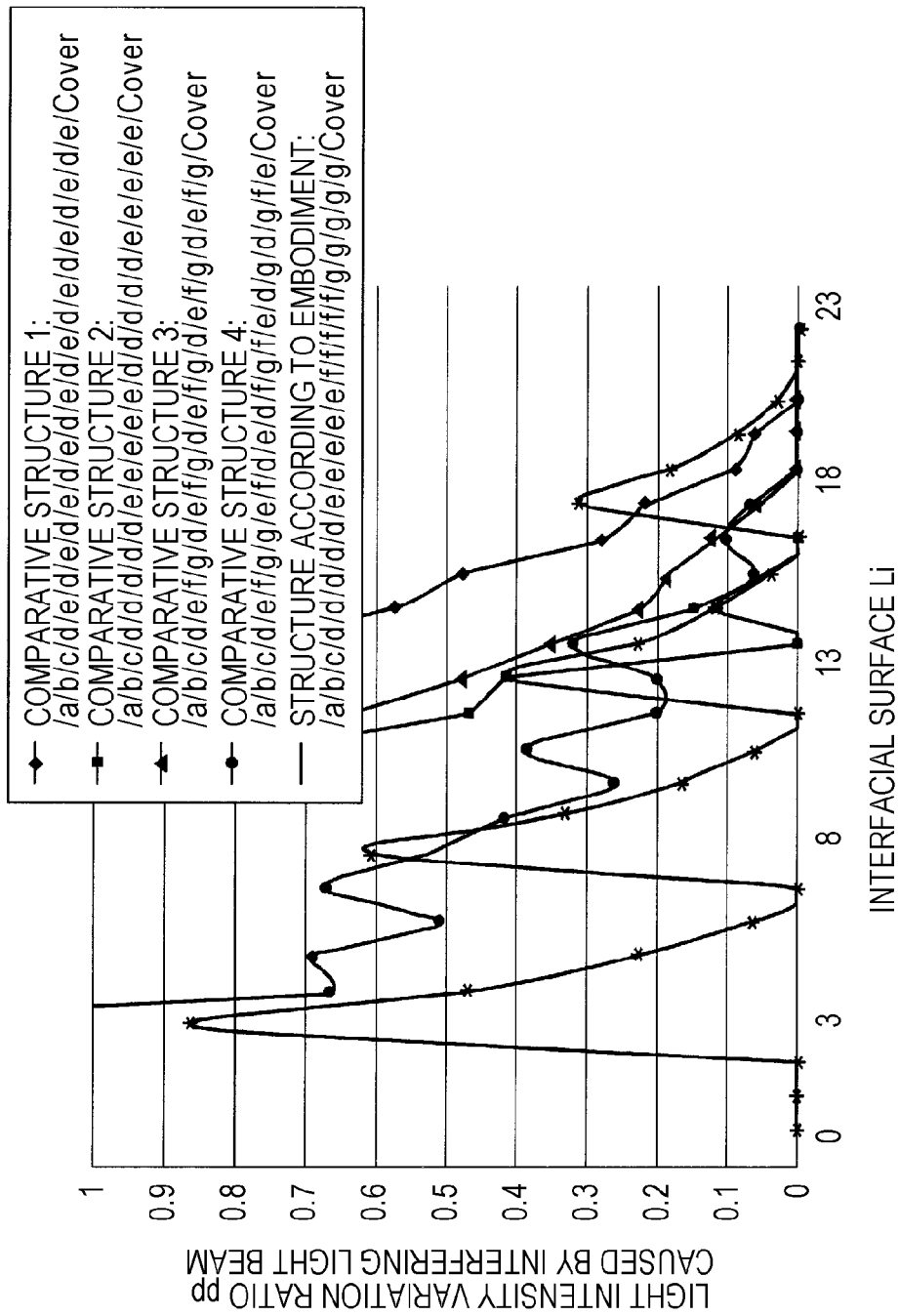
FIG. 14 illustrates comparison of the light intensity variations in the comparative structures 1 to 4 and the exemplary structure according to the embodiment.

Under these conditions, the ordinate of FIG. 11 is changed to represent a maximum value (a pp value) of a light intensity variation caused by the interference when the number of the interfering light beams is less than or equal to 20, and FIG. 14 is depicted.

As can be seen from FIG. 14, in the exemplary structure according to the present embodiment, the light intensity variation is reduced to a value less than or equal to pp 0.9 (±45%).

In addition, in the exemplary structure according to the present embodiment, the light intensity variation is reduced to a significantly small value except for the interfacial surface $L_i$ that periodically exhibits the peak of the light intensity variation. In this regard, the exemplary structure according to the present embodiment differs from the comparative structures in which the light intensity variation gradually increases toward the lower layer.

Referring back to FIG. 11, in the exemplary structure according to the present embodiment, the number of interfering light beams on each of the interfacial surfaces L3, L8, L13, and L18 (i.e., the interfacial surface L located on the lowermost layer side in each of the equal-thickness layer units) is the same. However, as can be seen from FIG. 14, the light intensity variations on the interfacial surfaces L3, L8, L13, and L18 differ from one another. More specifically, the light intensity variation decreases in the following order: L18, L13, L8, and L3. That is, the light intensity variation increases toward the lower interfacial surface L.

The reason why the light intensity variation increases toward the lower interfacial surface even when the number of the interfering light beam is the same is that the interfacial surface Lm that contributes to three reflections is located on the lower layer side.

If the above-described exemplary structure according to the present embodiment is employed, that is, if the structure including equal-thickness layer units is employed, a light intensity variation caused by interference increases toward the equal-thickness layer unit on the lower layer side, as a whole.

In order to improve such a characteristic, the structure in which all the numbers of spacers sequentially arranged in the equal-thickness layer unit are set to 5 can be replaced by a structure in which an equal-thickness layer unit on the lower layer side has a smaller number of spacers arranged therein than that on the upper layer side, as shown in FIG. 10.

Figure 15:
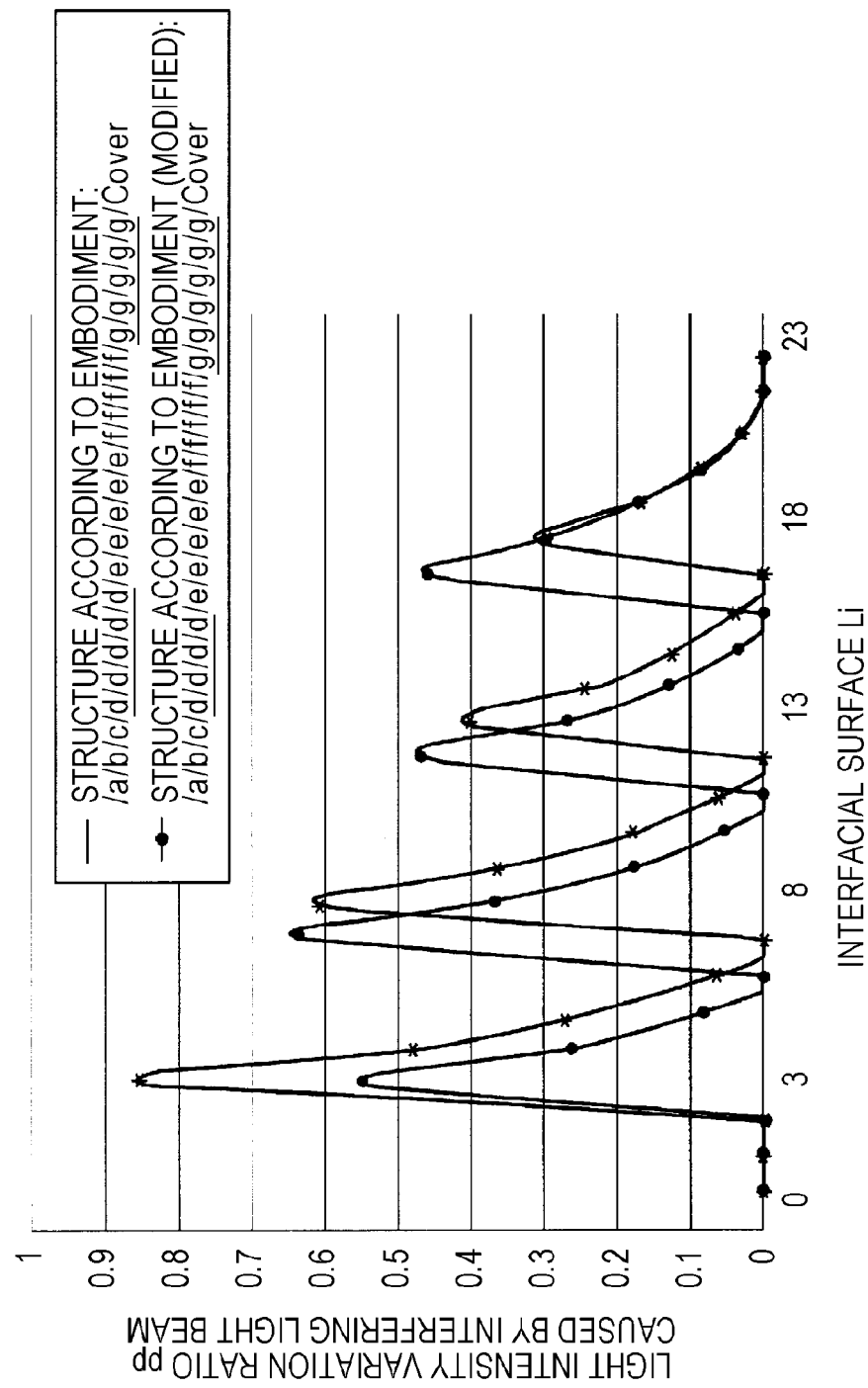
FIG. 15 illustrates an exemplary structure (modified) according to the embodiment.

FIG. 15 illustrates the light intensity variation (PP) for the individual interfacial surfaces $L_i$ (a plot ●) in an exemplary structure in which the number of spacers arranged in the equal-thickness layer unit on the lowermost layer side is set to 4 and the number of spacers arranged in the equal-thickness layer unit on the uppermost layer side is set to 6, that is, an exemplary structure having the following arrangement:

substrate/a/b/c/d/d/d/d/e/e/e/e/e/f/f/f/f/f/g/g/g/g/g/g/cover layer.

This exemplary structure is referred to as a "structure according to the present embodiment (modified)". In addition, as a comparative example, a light intensity variation (PP) for each of the interfacial surfaces $L_i$ (a plot *) in the exemplary structure shown in FIG. 10 is shown in FIG. 15.

As can be seen from FIG. 15, by decreasing the number of spacers arranged in the equal-thickness layer unit located on the lowermost layer side to 4, a light intensity variation on the interfacial surface L3 which is the largest in the exemplary structure shown in FIG. 10 can be effectively reduced. More specifically, in such a case, the light intensity variation can be reduced from about pp 0.85 to pp 0.55.

In contrast, in this case, since the number of spacers in the equal-thickness layer unit in the lowermost layer is reduced by 1, the number of spacers in the equal-thickness layer unit on the uppermost layer is increased to 6. However, comparison of FIGS. 14 and 15 indicates that, in this case, the light intensity variation is significantly small. This is because the further the interfacial surface Lm that contributes to three reflections is located toward the upper layer side, the light intensity of the interfering light beam becomes lower and, thus, the light intensity variation becomes smaller.

In this way, by employing the design to decrease the number of spacers arranged in the equal-thickness layer unit on the lower layer side, the effect of multiple interference can be more effectively reduced.

2-4 Examples of Setting of Thickness of Spacer

Hereinbefore, a particular spacer design method for effectively reducing the multiple interference while preventing a decrease in manufacturing efficiency has been described. In order to determine a specific spacer thickness, a design to "minimize the number of types of spacer and minimize the total thickness of the spacers" can be made while taking into account the optical design condition of each of the interfacial surfaces L, such as the reflectance and transmittance, and a process margin of spacer manufacturing.

An example of setting a specific "N" of an N-layer disc and determining the spacer thicknesses in the disc is described below.

If a disc structure that supports a BD optical system is designed, a minimum spacer thickness is about 10 μm. Accordingly, it is necessary for each of the spacers to have a thickness greater than the minimum thickness.

When N is large, a relatively thick spacer is employed as a spacer in a different thickness layer unit located on the lower layer side and a thin spacer is employed in each equal-thickness layer unit. In this way, the total thickness of the spacers can be effectively reduced.

Examples of setting the spacer thicknesses when N=16, 20, and 24 are described below.

Setting Example for 16 Layers
substrate/19/29/25/17/17/13/13/13/13/11/11/11/11/11/11/cover layer That is, the thicknesses a, b, and c of spacers in the different thickness layer unit are set so that a=19, b=29, and c=25. The thicknesses d, e, and f of spacers in three types of equal-thickness layer unit are set so that d=17, e=13, and f=11. In addition, the number of spacers arranged in the equal-thickness layer unit is decreased toward the lower layer side. More specifically, in this example, the number of spacers in the equal-thickness layer unit is increased from 2 to 4 to 6 from the lower layer side.

In such a case, the total spacer thickness=225 μm, and the sum of the thickness of the cover layer and the total spacer thickness=256 μm.

Such spacer thickness setting includes a negligible number of combinations having the same thickness even when a plurality of spacers are taken into account. Thus, the number of the interfering light beams can be effectively reduced.

Note that under the setting of the reflectance and transmittance shown in FIG. 12, the effective reflectance of each of the interfacial surfaces L is 1% to 1.2% (in practice, the reflectance detectable by the system has a value higher than that, since a stray light beam is present).

Setting Example for 20 Layers
substrate/21/29/25/19/19/17/17/17/17/13/13/13/13/11/11/11/11/11/11/cover layer Like the above-described example, the thicknesses a, b, and c of spacers in the different thickness layer unit are set so that a=19, b=29, and c=25. In this example, four types of equal-thickness layer unit for the thicknesses d, e, f, and g are provided on the upper layer side of the different thickness layer unit. At that time, d=19, e=17, f=13, and g=11. In addition, like the above-described example, the number of spacers arranged in the equal-thickness layer unit is decreased toward the lower layer side. More specifically, the number of spacers in the equal-thickness layer unit is increased from 2 to 4 to 4 to 6 from the lower layer side.

In such a case, the total spacer thickness=299 μm, and the sum of the thickness of the cover layer and the total spacer thickness=331 μm.

In this example, since the number of the spacers is increased (i.e., N=20), the number of types of spacer is increased from 3 (employed in the case of 16 layers) to 4. In this way, an increase in the number of interfering light beams can be prevented. As in the case of 16 layers, such spacer thickness setting includes a negligible number of combinations having the same thickness even when a plurality of spacers are taken into account. Thus, the number of the interfering light beams can be effectively reduced.

Under the setting of the reflectance and transmittance on each of the interfacial surfaces $L_i$ shown in FIG. 12, the effective reflectance of each of the interfacial surfaces $L_i$ is 0.7% to 0.9%.

Setting Example for 24 Layers
substrate/21/29/25/19/19/19/19/17/17/17/17/17/13/13/13/13/13/11/11/11/11/11/11/cover layer That is, in the above-described exemplary structure according to the present embodiment (modified), the thicknesses a, b, c, d, e, f, and g are set so that a=21, b=29, c=25, d=19, e=17, f=13, and g=11. When compared with the above-described example for 20 layers, the numbers of the types of spacer used in the equal-thickness layer unit are the same, and the number of spacers arranged in the equal-thickness layer unit excluding the equal-thickness layer unit in the uppermost layer is increased.

In such a case, the total spacer thickness=367 and the sum of the thickness of the cover layer and the total spacer thickness=399 μm.

As in the above-described examples, such spacer thickness setting includes a negligible number of combinations having the same thickness even when a plurality of spacers are taken into account. Thus, the number of the interfering light beams can be effectively reduced.

Under the setting of the reflectance and transmittance on each of the interfacial surfaces $L_i$ shown in FIG. 12, the effective reflectance of each of the interfacial surfaces $L_i$ is 0.5% to 0.7%.

In order to further increase the number of layers (e.g., N=30), the number of the types of spacer is further increased. In this case, the difficulty for selecting the spacer thicknesses that are numbers that are relatively prime and preventing interference caused by a plurality of spacers increases. In addition, the sum of the thickness of a cover layer and the total spacer thickness exceeds 400 and, therefore, the difficulty for correcting spherical aberration and adjusting a skew in a control operation performed by the drive system increases.

Furthermore, in order to further increase the number N, it is necessary to decrease the energy reflectance and increase the energy transmittance in the design of the recording films Lrc. For example, when 15 recording films Lrc having a transmittance of 95% are stacked, the recording power is attenuated to 46% of the original power on the lowermost recording films Lrc. When 20 recording films Lrc are stacked, the recording power is attenuated to 36% of the original power. When 25 recording films Lrc are stacked, the recording power is attenuated to 28% of the original power. Accordingly, as the number of layers increases, it becomes more difficult to design a multilayer optical recording medium in which the same effective recording power is provided to all of the recording films Lrc. In addition, if the number N is significantly large, it is significantly difficult to ensure the recording power necessary for the lower layer.

Accordingly, in multilayer optical recording media, if the number N exceeds 30, a big technical problem arises at this point of time, and it is significantly difficult to achieve the multilayer optical recording media.

3. Modifications

While the present invention has been described with reference to an embodiment, it should be noted that the present invention is not limited to the above-described examples.

For example, in the above description, the surface of the multilayer optical recording medium is covered with a non-reflective coating and, therefore, the thickness of each of the spacers is set without the surface included in the interfacial surface $L_i$. However, when nonreflective coating is not applied on the surface and it is necessary to include the surface as the interfacial surface $L_i$, the thickness of the cover layer 2 serving as a spacer should be taken into account.

At that time, the thickness of the cover layer 2 is set to a value different from any one of the other spacer thicknesses (including the case in which a spacer is placed on top of another spacer). For example, in the above-described case of setting for 16 layers, an example of the thickness of the cover layer 2 that satisfies the conditions is 31 µm. In this way, when the surface is included in the interfacial surface $L_i$, by setting the thicknesses of the various spacers including the thickness of the cover layer 2 serving as a spacer to numbers that are relatively prime, the thickness of the cover layer 2 can be made different from any one of the other spacer thicknesses (including the case in which a spacer is placed on top of another spacer).

While the above description has been made with reference to the interfacial surfaces $L_i$ including the selective reflecting film 3 (the reference surface Ref), the reference surface Ref can be excluded from the interfacial surfaces $L_i$ if, for example, the wavelength selectivity of the selective reflecting film 3 is close to 100% and, therefore, it is not necessary to take into account a three-times-reflected stray light beam that travels via the reference surface Ref.

In addition, while the above description has been made with reference to the different thickness layer unit including three types of spacer having thicknesses a, b, and c, the number of spacers in the different thickness layer unit is not limited to 3. The number of spacers in the different thickness layer unit can be at least plural (2 or greater).

As described above, the reason why the different thickness layer unit is provided in the lowermost layer portion is that the occurrence of an interfering light beam is prevented in the lowermost layer portion in which the light intensity is maximized. For example, when the number of the layers of the multilayer optical recording medium is small, the light intensity of an interfering light beam on the interfacial surface L2 is also small. Accordingly, the occurrence of an interfering light beam may be allowed. In such a case, the different thickness layer unit can include arrangement of only two types of spacer having thicknesses of a and b. In this way, the number of spacer arrangements in the different thickness layer unit can be determined in accordance with the number of layers of the multilayer optical recording medium (the number of the interfacial surfaces $L_i$).

In the above description, a particular guideline for limiting the number of the spacer arrangements in the equal-thickness layer unit is not mentioned. However, the number of the spacer arrangements in the equal-thickness layer unit can be set on the basis of, for example, the following guideline.

Figure 16A:
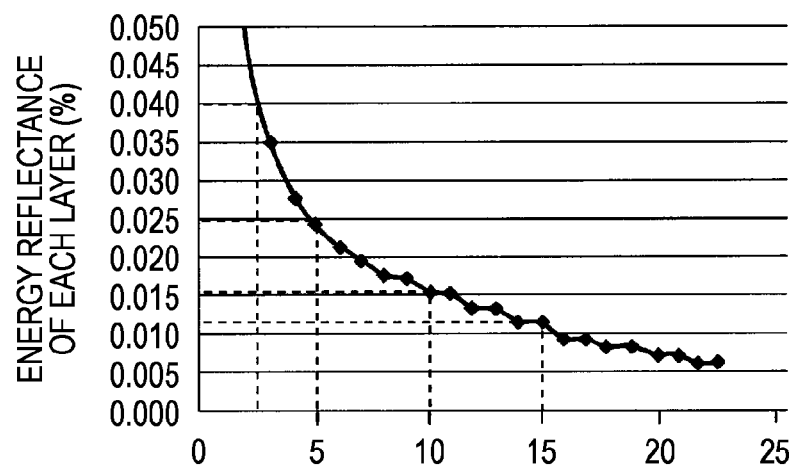
FIGS. 16A and 16B illustrate design guidelines used when the number of spacers arranged in a different thickness layer unit is determined.
Figure 16B:
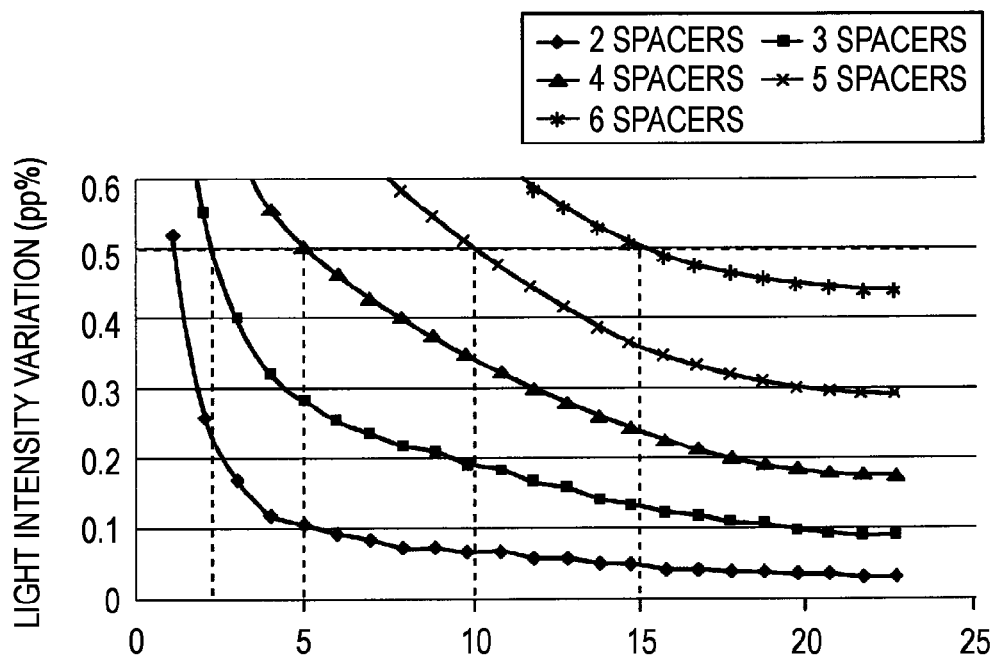
Figure 17:
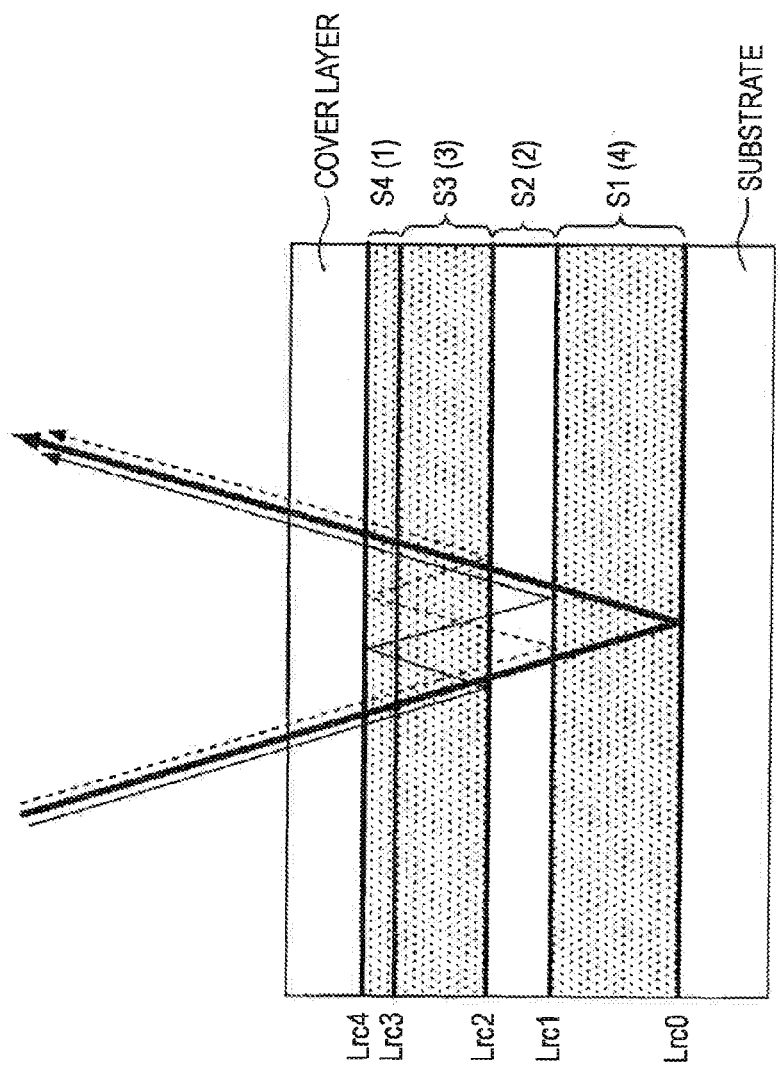
FIG. 17 illustrates the way multiple interference occurs in a multilayer optical recording medium including four or more recording films.

FIG. 16A illustrates the energy reflectance on each of the interfacial surfaces $L_i$. FIG. 16B illustrates estimated light intensity variation (the maximum value pp) caused by multiple interference on the interfacial surface $L_i$ when n spacers (n=2 to 6) are arranged above any target interfacial surface $L_i$ (Lj) under the setting of the reflectance and the transmittance for the above-described 24-layer disc (refer to FIG. 12).

As can be seen from FIGS. 16A and 16B, when the light intensity variation caused by multiple interference is allowed within 50% of the maximum value pp (±25%), up to 6 spacer arrangements are allowable in an upper layer region above the interfacial surface L15 having a reflectance of 1.2%. In addition, in the upper layer region above the interfacial surface L10 having a reflectance of 1.2%, 5 spacer arrangements are allowable. Furthermore, in a region in which the reflectance is lower than or equal to 2.5% (in an upper layer region above the interfacial surface L5), 4 spacer arrangements are allowable. In a region in which the reflectance is lower than or equal to 4%, 3 spacer arrangements are allowable.

In the expression shown in [Math. 1], when a reflectance r is low and a transmittance t is high (i.e., when the interfacial surface $L_i$ is located on the upper layer side), the value of the denominator "r~mrm+tm²" is substantially 1. Thus, the value of the numerator "±2√(r~mrm)×tm" is proportional to the reflectance r. Accordingly, the light intensity variation caused by multiple interference is proportional to the energy reflectance of the target interfacial surface $L_i$.

In addition, let n denote the number of spacers arranged in the equal-thickness layer unit. Then, the number of occurrences of an interfering light beam on the interfacial surface $L_i$ on which the interfering light beam occurs the greatest number of times in the equal-thickness layer unit is "n(n−1)/2".

Under such assumptions, the number of spacers arranged in the equal-thickness layer unit can be determined on the basis of an energy reflectance ($r_i$) of the interfacial surface $L_i$ located on the lowermost layer in the target equal-thickness layer unit and "n(n−1)/2" described above.

More specifically, for example, one of the guidelines for determining the number of spacers arranged in the equal-thickness layer unit can be expressed as follows:

$$r_i \times n(n-1)/2 < 20.$$

In addition, the structure illustrated as the multilayer optical recording medium 1 in FIG. 1 in the above description is only an example. The structure of the multilayer optical recording medium can be appropriately and optimally determined in accordance with an actual embodiment.

For example, a position indicator in the form of, for example, a groove can be provided in each of the recording films Lrc. In such a case, the necessity of the reference surface Ref (the selective reflecting film 3) may be eliminated.

Any structure including at least a plurality of interfacial surfaces that reflect an incident light beam can be employed for a multilayer optical recording medium according to the present invention.

The present application contains subject matter related to that disclosed in Japanese Priority Patent Application JP 2010-094092 filed in the Japan Patent Office on Apr. 15, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A multilayer optical recording medium comprising:
a plurality of interfacial surfaces configured to reflect an incident light beam, neighboring ones of the interfacial surfaces having a spacer therebetween;
wherein,
when a light incident surface side is an upper surface side, a different thickness layer unit including the spacers having different thicknesses arranged sequentially is disposed on the lowermost layer side and the spacers each having a thickness different from the thickness of any one of the spacers arranged in the different thickness layer unit are sequentially arranged above the different thickness layer unit,
the different thickness layer unit includes three types of spacer having different thicknesses arranged therein,
a plurality of equal-thickness layer units each including spacers having the same thickness sequentially arranged therein are formed above the different thickness layer unit, and
the thickness of the spacers arranged in one of the equal-thickness layer unit differs from the thickness of the spacers arranged in any one of the other equal-thickness layer units.

2. The multilayer optical recording medium according to claim 1, wherein each of the thickness of one of the spacers in any one of the equal-thickness layer units and the sum of the thicknesses of any number of the spacers sequentially arranged from any point in the equal-thickness layer unit differs from each of the thickness of any one of the spacers and the sum of the thicknesses of any number of the spacers sequentially arranged from any point outside the equal-thickness layer unit.

3. The multilayer optical recording medium according to claim 1, wherein a surface located as the uppermost surface is covered with a nonreflective coating.

4. The multilayer optical recording medium according to claim 1, wherein the surface located as the uppermost surface serves as one of the interfacial surfaces that reflect the incident light beam, and wherein a thickness of a spacer formed between the surface and the interfacial surface neighboring the surface and serving as a cover layer differs from the thickness of any one of the other spacers.

5. The multilayer optical recording medium according to claim 1, wherein the numbers of the spacers arranged in the equal-thickness layer units are the same.

6. The multilayer optical recording medium according to claim 1, wherein as a whole, the number of spacers in the equal-thickness layer unit decreases the further the equal thickness layer unit is formed toward the lower layer side.

7. The multilayer optical recording medium according to claim 1, wherein the number of the spacers in one of the equal-thickness layer units excluding the equal-thickness layer units formed on the uppermost layer side and the lowermost layer side is set to 5.

* * * * *